US008458805B2

(12) United States Patent
Adelstein et al.

(10) Patent No.: US 8,458,805 B2
(45) Date of Patent: ***Jun. 4, 2013

(54) DIGITAL FORENSIC ANALYSIS USING EMPIRICAL PRIVILEGE PROFILING (EPP) FOR FILTERING COLLECTED DATA

(75) Inventors: Frank Adelstein, Ithaca, NY (US); Carla Marceau, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 986 days.

This patent is subject to a terminal disclaimer.

(21) Appl. No.: 12/469,558

(22) Filed: May 20, 2009

(65) Prior Publication Data

US 2009/0288164 A1 Nov. 19, 2009

Related U.S. Application Data

(60) Continuation-in-part of application No. 12/370,447, filed on Feb. 12, 2009, now Pat. No. 8,176,557, which is a division of application No. 10/608,767, filed on Jun. 23, 2003, now Pat. No. 7,496,959, application No. 12/469,558, which is a continuation-in-part of application No. 11/496,252, filed on Jul. 31, 2006, now Pat. No. 7,818,804.

(51) Int. Cl.
*G06F 7/04* (2006.01)

(52) U.S. Cl.
USPC .............................. 726/27; 726/30; 713/187

(58) Field of Classification Search
None
See application file for complete search history.

(56) References Cited

U.S. PATENT DOCUMENTS

| 6,345,283 | B1 | 2/2002 | Anderson |
| 6,792,545 | B2 * | 9/2004 | McCreight et al. .............. 726/29 |
| 7,058,968 | B2 | 6/2006 | Rowland et al. |
| 7,496,959 | B2 | 2/2009 | Adelstein et al. |
| 7,536,456 | B2 | 5/2009 | Williams et al. |
| 7,748,040 | B2 | 6/2010 | Adelstein et al. |
| 7,885,190 | B1 | 2/2011 | Roesch et al. |
| 7,895,317 | B2 | 2/2011 | Gingell et al. |
| 2002/0078382 | A1 | 6/2002 | Sheikh et al. |
| 2002/0129264 | A1 | 9/2002 | Rowland et al. |
| 2002/0162017 | A1 | 10/2002 | Sorkin et al. |

(Continued)

FOREIGN PATENT DOCUMENTS

WO WO 02071192 A2 9/2002

OTHER PUBLICATIONS

Office Action from U.S. Appl. No. 12/370,447, dated Oct. 28, 2011, 14 pp.

(Continued)

*Primary Examiner* — Pramila Parthasarathy
(74) *Attorney, Agent, or Firm* — Shumaker & Sieffert, P.A.

(57) ABSTRACT

A forensic device allows a user to remotely interrogate a target computing device in order to collect and analyze computer evidence that may be stored on the target computing device. The forensic device acquires the computer evidence from the target computing device and filters the computer evidence using an application-specific system-level privilege profile that describes the aggregate exercise of system-level privileges by a plurality of software application instances executing throughout an enterprise. The forensic device presents a user interface through which the remote user views the filtered computer evidence acquired from the target computing device. In this manner, forensic device allows the user to filter the collected computer evidence to data that is likely to have forensic relevance.

33 Claims, 25 Drawing Sheets

U.S. PATENT DOCUMENTS

| | | |
|---|---|---|
| 2002/0163934 A1 | 11/2002 | Moore et al. |
| 2002/0184486 A1 | 12/2002 | Kershenbaum et al. |
| 2003/0208689 A1 | 11/2003 | Garza |
| 2004/0260733 A1 | 12/2004 | Adelstein et al. |
| 2007/0297349 A1 | 12/2007 | Arkin |
| 2008/0114873 A1 | 5/2008 | Chakravarty et al. |
| 2009/0019141 A1 | 1/2009 | Bush et al. |
| 2009/0089361 A1 | 4/2009 | Womack et al. |
| 2009/0216867 A1 | 8/2009 | Pusateri et al. |
| 2010/0077075 A1 | 3/2010 | Cuni et al. |
| 2011/0167154 A1 | 7/2011 | Bush et al. |

OTHER PUBLICATIONS

Response to Office Action dated Oct. 28, 2011, from U.S. Appl. No. 12/370,447, filed Dec. 28, 2011, 9 pp.

Office Action from U.S. Appl. No. 12/503,763, dated Oct. 27, 2011, 32 pp.

Response to Office Action dated Oct. 27, 2011, from U.S. Appl. No. 12/503,763, filed Jan. 11, 2012, 14 pp.

Office Action from U.S. Appl. No. 12/370,447, dated May 12, 2011, 10 pp.

Response to Office Action dated May 12, 2011, from U.S. Appl. No. 12/370,447, filed Aug. 8, 2011, 11 pp.

Office Action from U.S. Appl. No. 12/503,763, dated Apr. 15, 2011, 25 pp.

Response to Office Action dated Apr. 15, 2011, from U.S. Appl. No. 12/503,763, filed Aug. 15, 2011, 25 pp.

* cited by examiner

DIGITAL FORENSIC ANALYSIS USING EMPIRICAL PRIVILEGE PROFILING (EPP) FOR FILTERING COLLECTED DATA

This application is continuation-in-part of U.S. patent application Ser. No. 12/370,447, filed Feb. 12, 2009, now U.S. Pat. No. 8,176,557, which is a divisional application of U.S. application Ser. No. 10/608,767, filed Jun. 23, 2003, now U.S. Pat. No. 7,496,959, the entire contents of both of which are incorporated herein by reference. This application is also a continuation-in-part of U.S. patent application Ser. No. 11/496,252, filed Jul. 31, 2006, now U.S. Pat. No. 7,818,804, the entire content of which is incorporated herein by reference.

TECHNICAL FIELD

The invention relates to computer forensics and, more particularly, to techniques for remotely acquiring and analyzing computer forensic evidence relating to a target computer.

BACKGROUND

Computer forensics is the application of computer investigation and analysis techniques to identify and capture potential legal evidence stored or otherwise maintained within a computing device. The evidence might be sought during an investigation for a wide range of potential computer crimes or misuse, including theft of trade secrets, theft of service, theft of or destruction of intellectual property, fraud, hacking, and other criminal or misuse activities. Unlike paper evidence, computer evidence can exist in many forms, with earlier versions and even some deleted versions of the evidence still accessible on a storage medium. Forms of computer evidence may include, for example, system log files, executing processes, stored files and the like.

An investigator may draw on an array of methods to discover and capture evidence from a computer device. One common method for obtaining computer evidence is on-site inspections or seizure of the computer. For example, the investigator may physically connect an analysis device to the target computer or load analysis software on the target device to acquire and analyze the computer evidence. However, when these discovery techniques are used on computers critical to a network, e.g., servers, the investigation may become burdensome on the network users. Moreover, it is often desired to collect evidence from a computer over time without being detected by a perpetrator of the crime, which can be difficult with many of these invasive techniques.

SUMMARY

In general, the invention is directed to a computer forensic system for retrieval and analysis of computer evidence. The computer forensic system includes a forensic device that allows a user, such as an investigator or network administrator, to remotely interrogate a target computing device in order to collect and analyze computer evidence that may be stored on target computing device. The forensic device allows the user to acquire the computer evidence from the target computing device with a reduced impact on target computing device. In other words, the forensic device allows the user to interrogate the target computing device to acquire the computer evidence without requiring the physical seizure or otherwise "shutting down" of the target device.

The forensic device may be physically connected to the same local subnet as the target computing device, e.g., the same LAN on which the target computing device resides. The forensic device may, for example, obtain an Internet Protocol (IP) address within the subnet scope of the LAN to which the target device is connected. The forensic device may obtain the IP address either dynamically via a protocol such as Dynamic Host Configuration Protocol (DHCP) or statically via configuration by a network administrator.

The forensic device provides a seamless, network-based interface by which the remote user accesses the forensic device. Particularly, the user may connect to the forensic device via a web-based interface over either a public or private network. The connection through which the user connects to the forensic device may be a secure connection through the network such that all the data sent between the forensic device and the user is encrypted to prevent unauthorized access to the data. The forensic device may utilize a communication protocol such as HTTPS (hypertext transport protocol with SSL, secure socket layer) to send encrypted data securely to the user.

Once the user is connected and logged into the forensic device, the forensic device presents the user with a list of available forensic inquiries as well as an option to create a new forensic inquiry. The user may create a new forensic inquiry to acquire data, i.e., computer evidence, from the target computing device. The forensic device may, for example, present the user with one or more screens to allow the user to input information necessary for the creation of the new forensic inquiry. The forensic device may require the user to input case information to associate the new forensic inquiry with an ongoing case as well as target device information specifying a target device of the new inquiry. The target device of an inquiry may be the same as, or different than, the target device of any other inquiry in the same case. The case information may include, for example, a case number, case name, principle investigator, location to store the collected data, and a time zone for data and time reporting. Target device information may include a target device host name, IP address, operating system, access methods and password. The forensic device generates a new forensic inquiry based on the data input by the user and stores the inquiry information, e.g., case information and target device information.

The forensic device presents a wide array of possible acquisition operations that the forensic device may perform for the newly defined inquiry. The acquisition operations include, for example, acquiring log files, communication statistics, e.g., Ethernet or protocol statistics, general system data, running process information, open network ports and associated processes, account information, file sharing information, TCP/IP network information, and the like. The user may select any combination of the possible acquisition operations provided by the forensic device to acquire state information of the target computing device as well as files and additional computer evidence.

In return, the forensic device interrogates the target device to acquire the data, i.e., computer evidence, identified by the user. Particularly, the forensic device performs the combination of acquisition operations selected by the user and stores the acquired data. The forensic device communicates commands associated with the acquisition operations to the operating system of target computing device. The forensic device is platform independent, i.e., can communicate with any target device regardless of the type of operating system run on the target device. In other words, the forensic device may acquire data from a target device running on any type of operating system, e.g., Windows® 2000, Windows NT®, Unix®, MacOS™ and the like.

The forensic device performs the selected combination of acquisition operations in a determined order to reduce the impact the acquisition operations have on other data stored within target computing device. In other words, upon receiving the selection of the user, the forensic platform analyzes the selected combination of acquisitions operations and determines an order for their performance to maintain the integrity of the captured evidence. For example, some acquisition operations may have dependencies on other acquisition operations. In other words, the performance of one acquisition operation may affect the integrity of the evidence yet to be captured by another acquisition operation. For example, acquisition operations performed prior to the acquisition operation to acquire a log file may result in additional entries in the log file. In this case, the acquisition operation to acquire log files should be performed early in the acquisition process to reduce the amount of change to the data. The forensic device invokes the acquisition operations on the target computing device in a particular order to reduce the affects of these dependencies.

Upon acquisition of the computer evidence from the target computing device, the forensic device stores an original copy of the acquired data. In addition, the forensic device normalizes the acquired data, i.e., converts the acquired data to a standard format, to enhance the ability of forensic device to analyze the acquired data. For example, normalizing the acquired data allows the forensic device to simultaneously analyze data acquired from target devices with different operating systems, target computing devices running in different time zones, and the like. The forensic device may, for instance, convert timestamp data from a local time zone of the target device to a standard time zone, e.g., UTC. In addition, the forensic unit may convert data that has host names and IP addresses to all one format, i.e., either all host names or all IP addresses.

Further, the forensic device preserves the authenticity of the data. The forensic device may, for example, take a checksum of the acquired data using a cryptographic hash, such as an MD5 hash, and store the associated hash value. The cryptographic hash produces an output "fingerprint" for data on which the hash is performed that is computationally infeasible to duplicate using a different set of data. In this manner, the user can prove the integrity of the data by reapplying the cryptographic hash to the original data to obtain a fingerprint and comparing the fingerprint to the fingerprint taken at the time the data was acquired.

The forensic device provides one or more data analysis software modules ("tools") to the user for viewing and analyzing the data. The data analysis tools may include, for example, a time analysis tool, a checksum verification tool, a file viewer, and network tools. The time analysis tool may be used to analyze log files for tampering. More specifically, the time analysis tool may analyze the log files to verify the log file entries are in chronological order, to detect anomalous gaps in the log entries, and to detect the absence of expected periodic log entries. The checksum verification tool allows the user to run the cryptographic hash on one or more files and compare the results with the fingerprint obtained upon acquisition of the original files. The file viewer presents data acquired from target device to the user. The file viewer may present the user with raw data, summaries of the data, or the like.

The software tools provide a user interface by which the investigator is able to select and apply one or more filters to the raw data. In one embodiment, the software tools of the forensic device utilize application profiles to filter the raw data, where each application profile is generated by an empirical privilege profiler (EPP) system that monitors the resources used by running software processes throughout an enterprise so as to build a profile of the application's normal resource use. This resource usage profile, described herein as an "application profile," is accessed by the forensic device and used to filter out extraneous, forensically uninteresting data from the collected evidence.

After viewing and analyzing at least a portion of the acquired data, the user may determine whether acquisition of additional data is necessary. The forensic device allows the user to acquire additional data from the target computing device. The forensic device may, for example, provide the user with the ability to acquire additional files or additional system state data from the target device. For instance, the user may browse through a file directory of the target computing device and select a particular file to acquire. The user continues to acquire, analyze and interpret data from the target computing device to determine the next step of the investigation, e.g., seize the target computing device, continue to monitor the target computing device, or look for evidence elsewhere.

Additionally, the forensic device provides measures to ensure that the authenticity of the evidence collected may be verified for use in legal proceedings. In particular, the forensic device maintains an audit log of every transaction and operation performed during the evidence acquisition process, and associates the log file with the respective inquiry. For example, the audit log may include a timestamp corresponding to each transaction, an investigator identifier corresponding to the investigator performing each transaction, and a description of each transaction. The audit log may be used to determine the impact that the investigation, i.e., the acquiring of computer evidence from target computing device, may have on other data stored on target computing device, which may aid in analysis of the acquired computer evidence as well as preserving the authenticity of the acquired computer evidence. In addition, the forensic device may be configured to only perform "constrained" searches in which the user may have limited privileges within the target computing device, thereby providing a degree of security as to the use and application of the forensic device.

In one embodiment, the invention is directed to a method that comprises capturing empirical information relating to the exercise of privileges by a plurality of software application instances executing on top of a plurality of instances of a platform, and dynamically generating an application profile that describes the aggregate exercise of privileges by the plurality of software application instances based on the empirical information. The method further comprises receiving, with a forensic device, input from a remote user of a client device that identifies computer evidence to acquire from a target computing device. The method further comprises acquiring the computer evidence from the target computing device with the forensic device; filtering the computer evidence on the forensic device with the application profile; and presenting a user interface for the forensic device through which the remote user views and analyzes, using the client device, the filtered computer evidence acquired from the target computing device. In another embodiment, a method comprises receiving information relating to the exercise of privileges by a plurality of software application instances executing on top of a plurality of instances of a platform residing within a plurality of client devices via log files uploaded by the plurality of client devices; executing computer-implemented privilege profiling software to dynamically generate an application profile that describes the aggregate exercise of privileges by the plurality of software application instances based the uploaded log files; and communicating the application profile to a forensic device for filtering forensic evidence.

In another embodiment, the invention is directed to a system that comprises a plurality of client computing devices that capture empirical information relating to the exercise of privileges by a plurality of software application instances executing on top of a plurality of instances of a platform residing within the plurality of client computing devices. An empirical privilege profiler system dynamically generates an application profile that describes the aggregate exercise of privileges by the plurality of software application instances based the empirical information. The system further includes a target computing device; a forensic device coupled to the target computing device via a customer network of the target computing device; and an access device executing a user interface module to present a user interface for the forensic device that is remotely accessible by the access device. The forensic device acquires computer evidence from the target computing device, filters the computer evidence using the application profile generated by the empirical privilege profiler by identifying resources within the computer evidence that do not match the application profile, and presents the filtered computer evidence to the remote user for analysis via the user interface.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7 is a screen illustration of an exemplary user interface presented by the forensic device for capturing case information from a remote user.

FIG. 8 is a screen illustration of an exemplary user interface presented by the forensic device for capturing target device information from the user.

FIG. 12 is a screen illustration of an exemplary user interface for viewing evidence acquired from a target computing device.

FIGS. 13A and 13B are screen illustrations of an exemplary user interface presented to the remote user upon selecting a process name in the user interface of FIG. 1.

FIG. 23 is a screen illustration of an exemplary user interface presented by the forensic device for viewing evidence acquired from a target computing device without filtering.

FIG. 24 is a screen illustration of an exemplary user interface presented by the forensic device for viewing evidence acquired from a target computing device when filtering is enabled using an aggregate priviledge profile for a software application.

DETAILED DESCRIPTION

Figure 1:
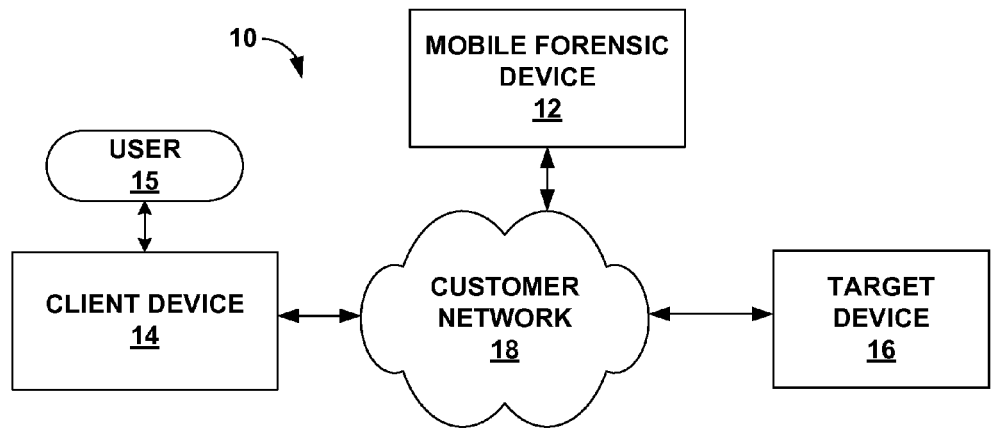
FIG. 1 is a block diagram illustrating an exemplary computer forensic system for retrieval and analysis of computer evidence.

FIG. 1 is a block diagram illustrating a computer forensic system 10 for retrieval and analysis of computer evidence. Computer forensic system 10 includes a forensic device 12 that allows a client device 14 operated by a user 15, such as an investigator or network administrator, to remotely interrogate a target computing device 16 in order to collect and analyze computer evidence that may be stored on target computing device 16. Forensic device 12 allows user 15 to acquire the computer evidence from target computing device 16 with a reduced impact on target computing device 16. For example, target computing device 16 need not be physically seized or otherwise "shut down" in order to acquire the computer evidence.

As illustrated in FIG. 1, client device 14, forensic device 12 and target computing device 16 are coupled to a common network, such as customer network 18. In this manner, customer network 18 acts as a communication link connecting forensic device 12 with target computing device 16. Customer network 18 may, for example, be a local area network for a specific site of an enterprise, or may span geographically distributed sites within the enterprise. In other words, customer network 18 may include one or more Local Area Networks (LANs), Wide Area Network (WANs), Wireless LANs or the like. Additionally, customer network 18 may include digital subscriber lines (DSLs), cables or other broadband connections. Customer network 18 may includes one or more connected network devices (not shown), such as personal computers, laptop computers, handheld computers, workstations, servers, routers, switches, printers, fax machines, or the like.

In general, forensic device 12 is typically connected to the same local subnet as target computing device 16, although this is not required. For example, in an embodiment in which customer network 18 includes more than one LAN, forensic device 12 may be connected to the same LAN as target computing device 16. In this manner, forensic device 12 obtains an Internet Protocol (IP) address within the subnet scope of the LAN to which target computing device 16 is connected. Forensic device 12 may obtain the IP address dynamically, e.g., via Dynamic Host Configuration Protocol (DHCP), or statically via configuration by a network administrator. Client device 14 connects user 15 to forensic device 12 via a secure connection through customer network 18. In this manner, all the data sent between forensic device 12 and user 15 is encrypted to prevent unauthorized access to the data. Forensic device 12 may, for example, use a communication protocol such as HTTPS (hypertext transfer protocol with SSL, secure socket layer) to encrypt and transmit data securely to user 15. Forensic device 12 may comprise a laptop computer, network appliance, or other computing device that includes a web server for communicating with client device 14 and one or more interrogation agents that acquire data from the operating system of target device 16. Target computing device 16 may comprise a personal computer, a handheld computer, a laptop computer, a workstation, a router, a gateway device, a firewall device, a web server, a file server, a database server, a mail server, a print server, a network-enabled personal digital assistant, and a network-enabled phone.

As will be described in further detail below, forensic device 12 allows user 15 to create a forensic inquiry to acquire computer evidence from target computing device 16. Forensic device 12 may present a login screen to user 15 via which user 15 inputs a username and password to connect to forensic device 12. User 15 may then input case information and target device information to define the forensic inquiry. The case information may associate the inquiry with a particular case currently under investigation. Target device information defines characteristics associated with target computing device 16, such as a host name of target device 16, an IP address associated with target device 16, a type of operating system run by target device 16, a password for accessing target device 16, and one or more methods for accessing target device 16, e.g., via invoking a Windows Management Instrumentation (WMI) or Server Message Block (SMB) client. User 15 may obtain at least a portion of the target device information from a network administrator or other individual prior to logging into forensic device 12. Forensic device 12 generates a new forensic inquiry based on the information input by user 15.

Forensic device 12 presents to user 15 a comprehensive list of possible acquisition operations that forensic device 12 can perform for the created forensic inquiry. The term "acquisition operation" refers to commands that forensic device 12 issues to target computing device 16 to acquire computer evidence, referred to herein generally as "data," from target computing device 16. User 15 specifies a combination of the acquisition operations to perform.

In response, forensic device 12 initiates the acquisition operations on target computing device 16 via one or more of the identified access methods to acquire data from target computing device 16. As will be described, forensic device 12 acquires the computer evidence from target computing device 16 while the target computing device is active. In other words, forensic device 12 acquires the computer evidence from the target computing device 16 without target computing device 16 being physically seized or otherwise "shut down." Additionally, forensic device 12 acquires the computer evidence from the target computing device without having to pre-load acquisition software on target computing device 16 prior to acquiring the computer evidence, i.e., prior to forensic device 12 beginning the investigation.

In accordance with one aspect of the invention, forensic device 12 may perform the acquisition operations in a particular order to reduce the impact the operations have on other data stored within target computing device 16, thereby maintaining the integrity of the data. In other words, some of the acquisition operations can change other data stored within target device 16. For example, acquisition operations performed before the acquisition operation for acquiring Ethernet statistics may change the Ethernet statistics, e.g., increase the unicast packet count. In this case, the acquisition operation to acquire the Ethernet statistics as well as any other acquisition operation whose associated data may be changed by performance of other acquisition operations should be performed early in the initial acquisition process. Forensic device 12 may use different access methods for acquisition operations based on the type of data to be acquired from target computing device 16 as well as the type of target computing device, e.g., the type of operating system executed by the target computing device. For example, forensic device 12 may perform an acquisition operation to acquire a log file via WMI while performing an acquisition operation to acquire network protocol statistics via SMB. In another example, forensic device 12 may perform an acquisition operation to acquire computer evidence from a target device with a Windows operating system via WMI while performing an acquisition operation to acquire computer evidence from a UNIX operating system using File Transfer Protocol (FTP).

Forensic device 12 may perform one or more actions on data acquired from target computing device 16 to normalize the data and further preserve the integrity of the data. Initially, forensic device 12 stores a copy of the original data acquired from target computing device 16. Forensic device 12 may further perform a cryptographic hash on all data at the time of acquisition, and store the resulting hash value for future comparison to verify the accuracy and integrity of the data at the time of use, e.g., within a legal proceeding. In addition, forensic device 12 may create a copy of the data in which the data is normalized to a common format to aid in the analysis. Further, forensic device 12 may instruct target computing device 16 to compute a cryptographic hash on the data before copying the data to forensic device 12 in order to ensure the data's integrity in transit.

Forensic device 12 provides user 15 with data analysis tools for viewing and analyzing the data acquired from target computing device 16. The data analysis tools may include, for example, a time analysis tool, a checksum verification tool, a file viewer, and network tools. Forensic device 12 may acquire computer evidence from target computing device 16 and allow user 15 to view and analyze the computer evidence via the data analysis tools with the data on-line. In this manner, user 15 does not have to go "off-line" to analyze the acquired data. In some cases, forensic device 12 may even allow user 15 to view and analyze previously acquired computer evidence while forensic device 12 collects additional forensic evidence. In this manner, the collection and analysis of forensic evidence may be done in parallel. As will be described, the time analysis tool may be used to analyze log files for tampering. Log files include system event log, application event log, security event log, web server log files, Unix SYSLOG files, mail log files, accounting log files, and router flow log files, and other files that maintain a list of operations performed by target computing device 16. More specifically, the time analysis tool may analyze the log files to verify the log file entries are in chronological order, to detect anomalous gaps in the log entries, and to detect the absence of expected periodic log entries.

After viewing and analyzing a portion of the data, user 15 may determine whether acquisition of more data is necessary. Forensic device 12 further provides user 15 with the ability to acquire supplementary data in addition to the data acquired in the initial acquisition. Forensic device 12 provides user 15 with the capability to acquire additional files or additional system state data from target computing device 16.

From the analysis of the data acquired from target computing device 16, user 15 may determine additional steps that need to be taken after the retrieval and analysis of the computer evidence from target computing device 12. User 15 may, for instance, determine that target computing device 16 should be seized, continue to be monitored, or does not hold the necessary data and therefore look elsewhere. Although the example of FIG. 1 illustrates forensic device 12 monitoring a single target computing device 16 for exemplary purposes, forensic device 12 may monitor a plurality of target computing devices. In addition, user 15 may connect to multiple forensic devices to interrogate target computing devices on different LANs. For example, user 15 may access a first forensic device coupled to a first LAN to acquire data from a first target device and access a second forensic device coupled to a second LAN to acquire data from a second target device. In this manner, user 15 may acquire and analyze computer evidence from multiple target devices located on multiple LANs.

Figure 2:
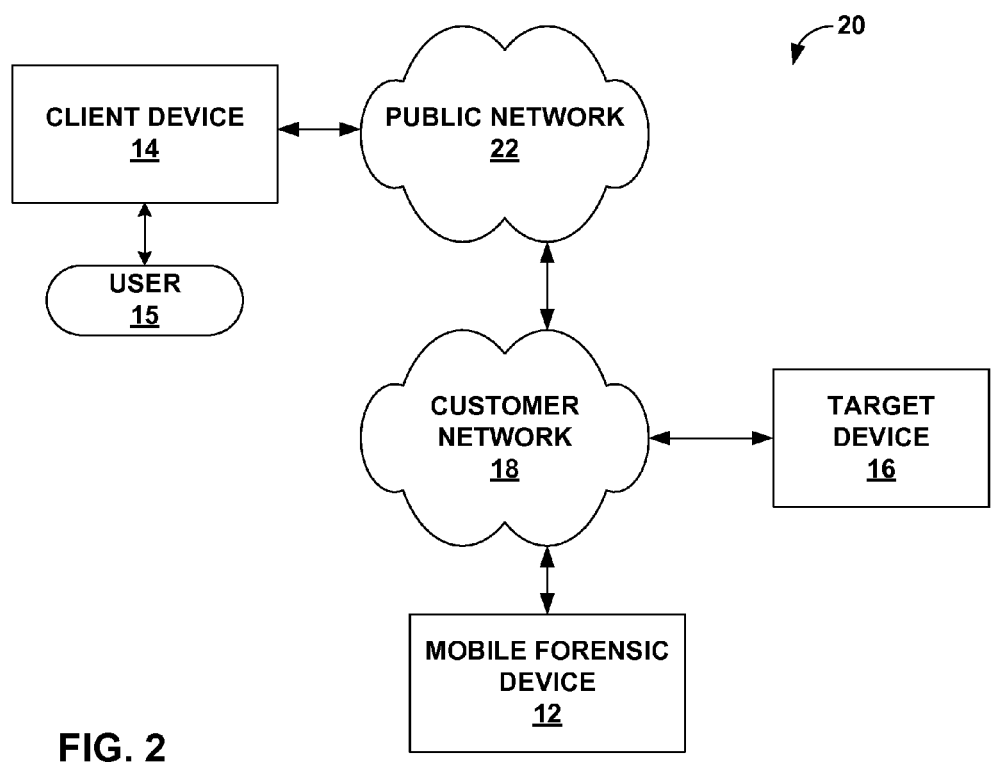
FIG. 2 is a block diagram illustrating another exemplary computer forensic system for retrieval and analysis of computer evidence.

FIG. 2 is a block diagram illustrating another exemplary computer forensic system 20 for retrieval and analysis of computer evidence in accordance with this disclosure. In this illustrated embodiment, computer forensic system 20 conforms substantially to computer forensic system 10 of FIG. 1, but user 15 connects to forensic device 12 via a public network 22, such as the Internet. Public network 22 may include digital subscriber lines (DSLs), cables or other broadband connections. In the example of FIG. 2, client device 14 may be configured to access forensic device 12 through a local network firewall or other network infrastructure of customer network 18.

Figure 3:
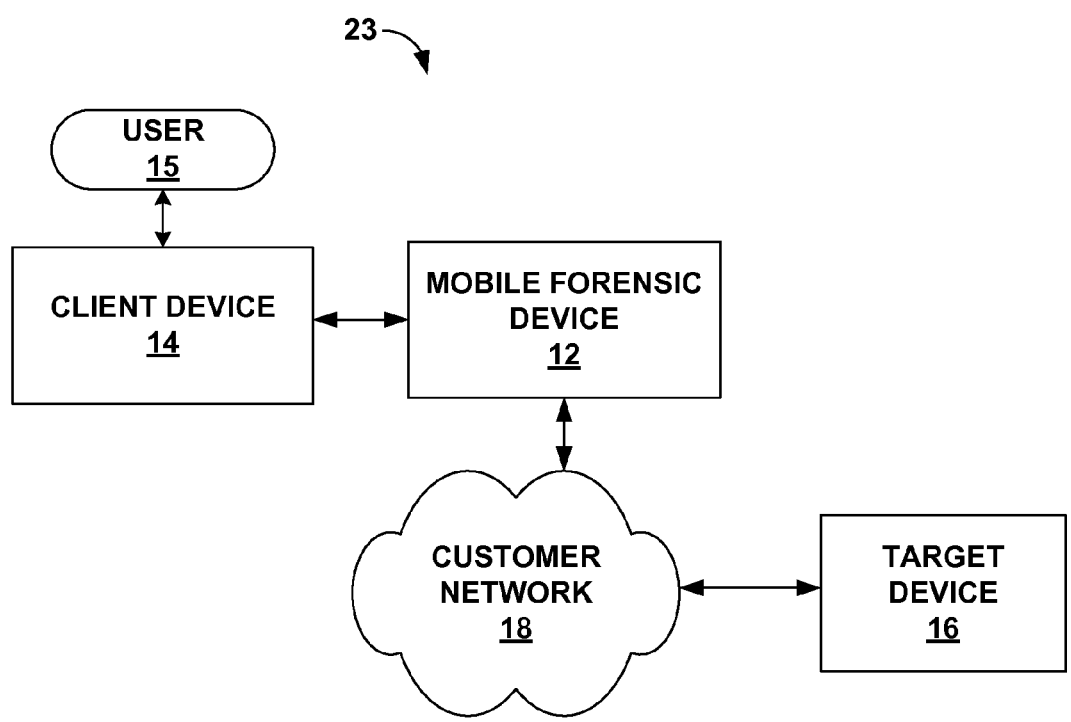
FIG. 3 is a block diagram illustrating another exemplary computer forensic system for retrieval and analysis of computer evidence.

FIG. 3 is a block diagram illustrating another exemplary computer forensic system 23 for retrieval and analysis of computer evidence in accordance with this disclosure. In this illustrated embodiment, computer forensic system 23 conforms substantially to computer forensic system 10 of FIG. 1, but user 15 connects directly to forensic device 12 instead of connecting to forensic device 12 via a network. In the example of FIG. 3, client device 14 may be configured to access forensic device 12 via a direct communication link, such as a phone line, a universal serial bus (USB), a wireless port, a serial port, a parallel port, an infrared (IR) link or any other type of direct connection.

Figure 4:
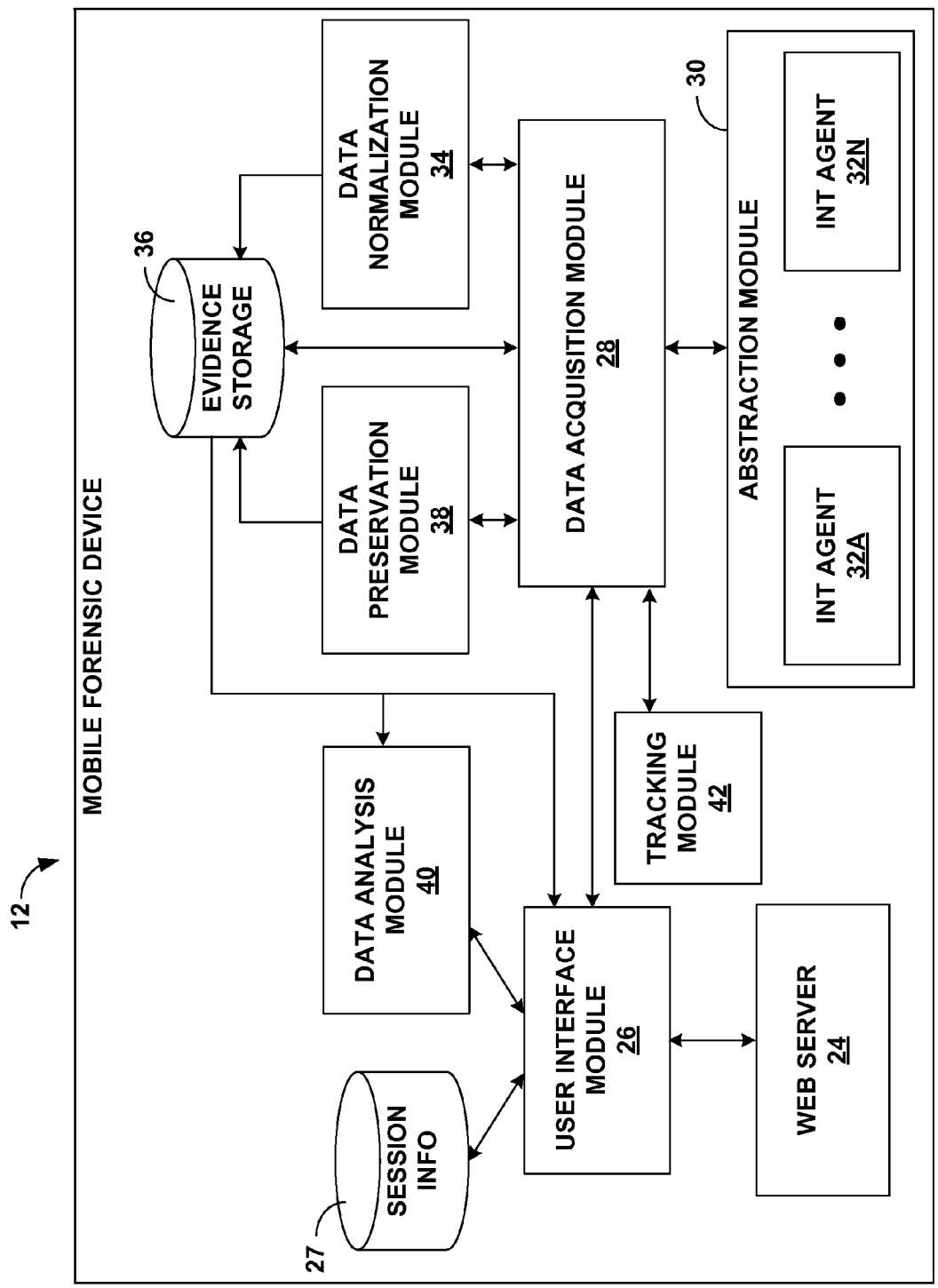
FIG. 4 is a block diagram illustrating an exemplary forensic device.

FIG. 4 is a block diagram illustrating forensic device 12 in further detail. As described above, forensic device 12 allows user 15 to remotely interrogate one or more target computing devices to acquire and analyze computer evidence that may be stored on the target computing devices.

Forensic device 12 may be connected to the same local subnet as target computing device 16, e.g., the same LAN as target computing device 16, allowing forensic device 12 and target computing device 16 to transfer data at a high speed. Specifically, forensic device 12 obtains an Internet Protocol (IP) address within the subnet scope of the LAN to which target computing device 16 is connected either dynamically via a protocol such as Dynamic Host Configuration Protocol (DHCP) or statically via configuration by a network administrator. Connecting forensic device 12 to the same local subnet as target computing device 16 permits forensic device 12 to have direct access to target computing device 16 without bypassing a local network firewall.

Forensic device 12 includes a web server 24 that provides a seamless, network-based interface by which remote user 15 accesses forensic device 12. More specifically, web server 24 provides a web-based interface by which user 15 interacts with forensic device 12 via a network, either public or private. In one configuration, web server 24 executes web server software to provide an environment for interacting with user 15 via a user interface module 26. User interface module 26 may include Common Gateway Interface (CGI) programs and a graphical user interface (GUI) generator for generating and presenting user interfaces to user 15. In various embodiments, the interface presented by forensic device 12 may include combinations of "server-side" user interface modules executing on web server 24 and "client-side" user interface modules, such as ActiveX® controls, JavaScripts™, and Java™ Applets, that execute on client device 14.

User 15 may connect to forensic device 12 via a computer network using a web browser. User 15 may, for instance, connect to forensic device 12 using the IP address assigned to forensic device 12, e.g., using the IP address in a Uniform Resource Locator (URL) such as https://12.34.56.78/MFP/index.html. Forensic device 12 presents user 15 with a user interface for logging into forensic device 12. Forensic device 12 receives login data from user 15, such as a username and password, to verify the identity of user 15. Alternatively, forensic device 12 may authenticate user 15 using a digital certificate. The connection through which user 15 connects to forensic device 12 may be a secure connection through the network such that all the data sent between forensic device 12 and user 15 is encrypted to prevent unauthorized access to the data.

Once user 15 is logged into forensic device 12, forensic device 12 presents user 15 with a list of current forensic inquiries, as well as an option to create a new forensic inquiry. User 15 may create a new forensic inquiry to acquire data, e.g., computer evidence, from target computing device 16. Forensic device 12 presents user 15 with one or more input screens to allow the user to input information necessary for the creation of the new forensic inquiry. Forensic device 12 may, for example, require user 15 to input case information to associate the new forensic inquiry with an ongoing case as well as target device information specifying a target device of the new inquiry. The case information may include, for example, a case number, case name, principle investigator, location to store the collected data, and a time zone for data and time reporting. Target device information may include a target device host name, IP address, operating system, access methods and password. Forensic device 12 generates a new forensic inquiry based on the information input by user 15 and stores the inquiry data, e.g., case information and target device information, in session information 27.

Forensic device 12 presents to user 15 a set of possible acquisition operations that forensic device 12 may perform for the newly defined inquiry. The initial acquisition operations include, for example, acquiring log files, communication statistics, e.g., Ethernet and protocol statistics, general system data, running process information, open network ports and associated processes, account information, file sharing information, and TCP/IP network information, and the like. User 15 may select a subset, all or none of the initial acquisition operations to be initially performed to acquire state information of the target computing device as well as files and additional computer evidence. For example, user 15 may check a box located adjacent the acquisition operation to select the acquisition operation.

As described above, forensic device 12 interrogates the target device defined by user 15 to acquire the computer evidence wanted by user 15. More specifically, forensic device 12 includes a data acquisition module 28 and an abstraction module 30 that cooperate to acquire data from target computing device 16. Data acquisition module 28 notifies abstraction module 30 of the one or more acquisition operations to perform, and abstraction module 30 performs the acquisition operations to acquire the computer evidence from target computing device 16.

Particularly, abstraction module 30 includes interrogation agents 32A-32N ("interrogation agents 32") that initiate acquisition operations based on the operating system executing on target computing device 16 and the type of computer evidence desired using one or more of the access methods defined in the corresponding forensic inquiry. Each of interrogation agents 32 is configured to communicate with a particular type of operating system, e.g., Windows 2000®, Windows NT®, Unix®, MacOS™ and the like, via a number of executable files and a remote command execution tool. Particularly, the remote execution tool may relay the appropriate executable files to target computing device 16 to obtain the data indicated by data acquisition module 28. In this manner, abstraction module 30 provides a layer of "abstraction" between interrogation agents 32 and data acquisition module 20, thereby allowing forensic device 12 to be platform independent. As a result, forensic device 12 may acquire data from a target device regardless of the type of operating system executing on the target device. Abstraction module 30 selectively invokes the appropriate interrogation agents 32 based on the input from remote user 15 identifying the operating system of target computing device 16.

Abstraction module 30 may further acquire data from target computing device 16 using different access methods based on the type of data to be acquired from target computing device 16. For example, forensic device 12 may perform an acquisition operation to acquire a log file via WMI while performing an acquisition operation to acquire network protocol statistics via SMB. Abstraction module 30 may be preconfigured to use specific access methods for acquiring specific types of data or user 15 may identify access methods for each of the acquisition operations.

Abstraction module 30 and, more particularly, a respective one of interrogation agents 32 may perform the specified combination of acquisition operations in a particular order to reduce the impact the operations on other data stored within target computing device 16, thereby maintaining an ensuring the integrity of the data. In other words, some of the acquisition operations can cause other data stored within target device 16 to change. For example, acquisition operations performed prior to the acquisition operation to acquire a log file may result in additional entries in the log file when later acquired. In this case, the acquisition operation to acquire log files should be performed early in the acquisition process to reduce the amount of change to the data.

In one embodiment, forensic device 12 may acquire an "image" of one or more disks attached to target computing device 16 remotely via the communication link between forensic device 12 and target computing device 16. The image is an exact copy ("bitstream copy" or "mirror") of all data on the disks, including data not normally visible via the operating system of target computing device 16. In addition, the image may also include an exact copy of memory (RAM) or memory swap space of target computing device 16. The image may be acquired by using software on target computing device 16 that performs a direct low-level read of the disks and/or memory of target computing device 16, then communicating the image to forensic device 12 via SMB or the like. Target computing device 16 continues to operate while forensic device 12 acquires the disk image, memory image, or both.

Forensic device 12 stores an original copy of the acquired data in an evidence storage database 36. In addition, forensic device 12 includes a data normalization module 34 that normalizes the acquired data, i.e., converts the acquired data to a standard format, to allow analysis tools to work on multiple types of data. For example, normalizing the acquired data allows the analysis tools to simultaneously analyze data acquired from target computing devices having different operating systems, target computing devices running in different time zones, and the like. Data normalization module 34 may, for instance, convert timestamp data from a local time zone of target device 16 to a standard time zone, e.g., UTC, or the time zone of forensic device 12. In another example, data normalization module 34 may normalize the clock of target computing device 16 to that of forensic device 12. In addition, data normalization module 34 may convert data that has host names and IP addresses to one or the other, not a mix. Normalized and original copies of the acquired data are stored in evidence storage database 36.

Further, forensic device 12 includes a data preservation module 38 to create a record for proving the integrity and authenticity of the acquired data. Data preservation module 38 may, for example, compute a checksum of the acquired data using a cryptographic hash, such as an MD5 hash, and store the hash value within evidence storage database 36. The cryptographic hash can be applied to data of an arbitrary length to produce an output "fingerprint." In the example of the MD5 hash, the output is a 128-bit "fingerprint" that is computationally infeasible to duplicate using a different set of data. Forensic device 12 may prove the integrity of the data by reapplying the cryptographic hash to the original data at a future time to obtain a fingerprint and comparing the fingerprint to the fingerprint taken at the time the data was acquired. In this manner, the user may prove the integrity and authenticity of the data at a future time to help ensure that the evidence is admissible in a legal proceeding. Additionally, data preservation module 38 may store information about the acquisition, such as the exact commands run during the acquisition, the date and time of the acquisition, the investigator who conducted the acquisition, and the like.

Forensic device 12 includes a data analysis module 40 that provides one or more data analysis tools to user 15 for viewing and analyzing the data. The data analysis tools may include, for example, a time analysis tool, a checksum verification tool, a file viewer, and network tools. As described, forensic device 12 may acquire data from target computing device 16 and allow user 15 to view and analyze the computer evidence on-line via the data analysis tools. In some cases, forensic device 12 may allow user 15 to view and analyze previously acquired computer evidence while forensic device 12 collects additional forensic evidence. In this manner, the collection and analysis of forensic evidence may be done in parallel. The time analysis tool may be used to analyze log files for tampering. As described above, log files include system event log, application event log, security event log, web server log files, Unix SYSLOG files, mail log files, accounting log files, and router flow log files, and other files that maintain a list of operations performed by target computing device 16. More specifically, the time analysis tool may analyze the log files to verify the log file entries are in chronological order, to detect anomalous gaps in the log entries, and to detect the absence of expected periodic log entries. The checksum verification tool allows user 15 to run the cryptographic hash on one or more files and compare the results with the fingerprint obtained upon acquisition of the original files. The file viewer presents data acquired from target device 16 to user 15. The file viewer may present the user with raw data, summaries of the data, or the like. The network tools allow user 15 to associate TCP/IP network connections with running processes, e.g., by port, by remote host name, or the like, can show all shared file systems to user 15, can show from which machines the target has drives/shares mounted, and the like. The analysis tools may interact with one another to provide user 15 with the ability to seamlessly move among various data types, e.g., files, processes, and the like. For example, user 15 can look at the TCP connection list, see a strange remote host, click on the associated local process, see a file open, and then acquire the file.

In embodiments in which forensic device 12 acquires an "image" of target computing device, data analysis module 40 may further provide tools for examining the acquired disk image or memory image to identify files, process or operating system data structures, boot information, or other structures on the image. In addition, forensic device 12 may contain custom or standard tools for extracting deleted files or directories from the disk image, viewing data hidden in unallocated space of the disk ("slack space"), or examining other information not normally available via the operating system of target machine 16.

After viewing and analyzing at least a portion of the acquired data, user 15 may determine whether acquisition of additional data is necessary. Data acquisition module 28 provides user 15 with the ability to acquire additional data from target computing device 16. Data acquisition module 28 may, for example, provide user 15 with the ability to acquire additional files or additional system state data from target computing device 16. For instance, user 15 may browse through a file directory of target computing device 16 and select a particular file, which abstraction module 30 acquires from target computing device 16. As with the other acquired data, the data file acquired by forensic device 12 is stored in original form, normalized, and associated with a hash value, i.e., fingerprint. User 15 continues to acquire, analyze and interpret data from target computing device 16 to determine additional steps that need to be taken. User 15 may, for instance, determine the necessity to seize target computing device 16, continue to monitor target computing device 16, or look for evidence elsewhere.

To further prove the authenticity of the evidence, a tracking module 42 maintains an audit log of every transaction performed during the inquiry process, including logging every file and data item downloaded from target computing device 16 and recording the browsing of the acquired data files by user 15 as well as analyses performed on the computer evidence. For example, the audit log may include a timestamp corresponding to each transaction, an investigator identifier corresponding to the investigator performing each transaction, and a description of each transaction. The audit log may be used to determine the impact that the investigation, i.e., the acquiring of computer evidence from target computing device 16, may have on other data stored on target computing device 16, which may aid in analysis of the acquired computer evidence as well as preserving the authenticity of the acquired computer evidence. For example, user 15 may access the audit log to illustrate the order in which the computer evidence was acquired from target computing device 16, the commands issued by forensic device 12, and the impact that each of the issued commands had on target computing device 16. Additionally, forensic device 12 may provide security measures to ensure that user 15 accesses only data necessary for the investigation and to ensure the appropriate use of forensic device 12. Data acquisition modules 28 may be configured, for example, to only perform "constrained" searches. In this manner, user 15 may have limited privileges within target computing device 16.

Figure 5:
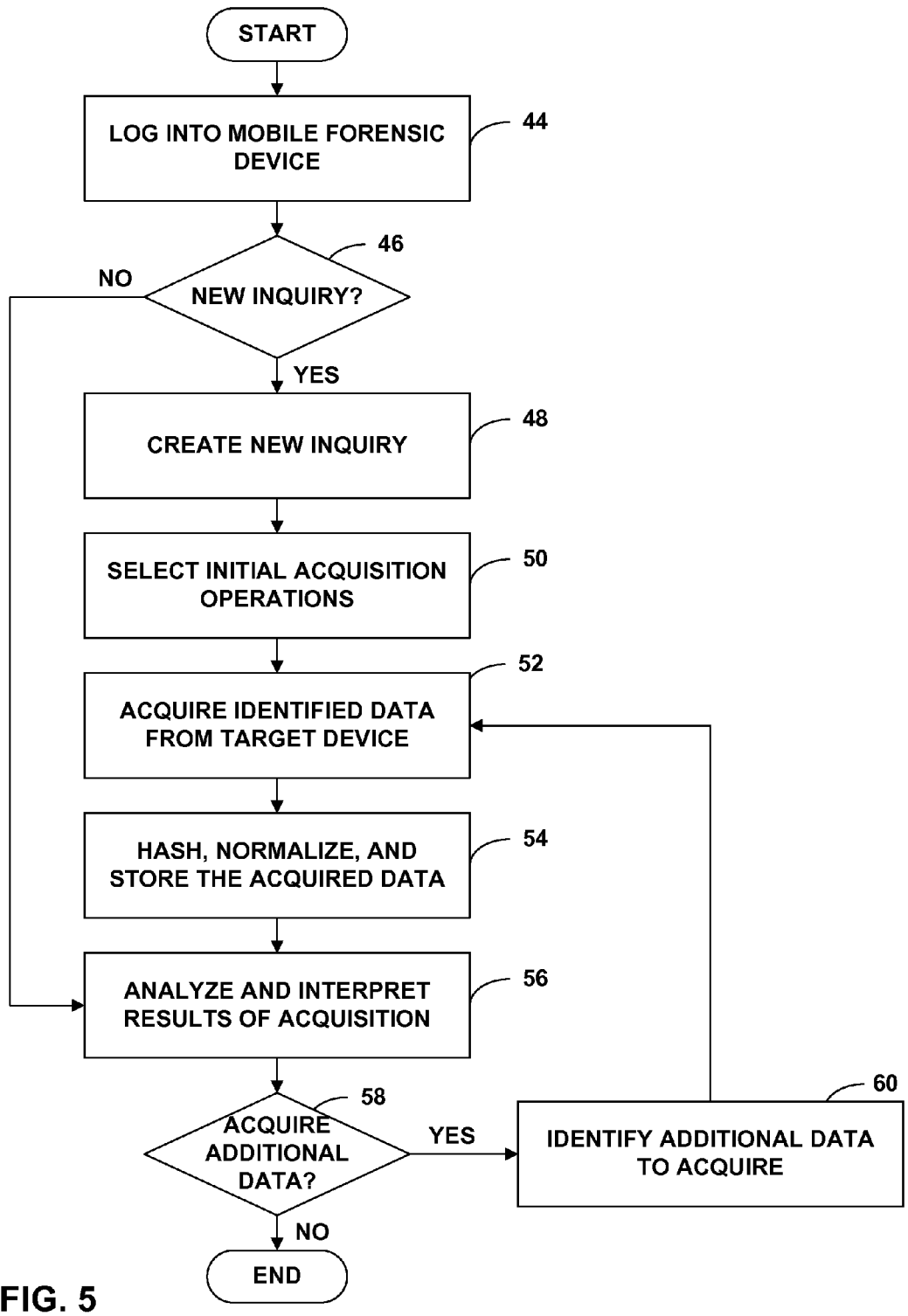
FIG. 5 is a flow diagram illustrating exemplary operation of a computer forensic system in acquisition and analysis of computer evidence of a target computing device.

FIG. 5 is a flow diagram illustrating exemplary operation of a computer forensic system 12 when acquiring and analyzing computer evidence from target computing device 16. Initially, user 15 connects to forensic device 12 via a web browser and inputs login information (44). For example, forensic device 12 may present user 15 with a user interface for inputting a username and password to log into forensic device 12. Alternatively, forensic device 12 may authenticate user 15 using a digital certificate or other digital credential.

Once user 15 is logged into forensic device 12, forensic device 12 presents user 15 with a user interface to select either a previous forensic inquiry or create a new forensic inquiry (46). If user 15 selects from a previously defined inquiry, user 15 analyzes and interprets the collected computer evidence (56). However, if user 15 does not select a previously defined forensic inquiry, forensic device 12 receives inquiry information from user 15 and creates a new forensic inquiry in accordance with the input (48). For example, forensic device 12 may present user 15 with one or more screens to allow user 15 to input information necessary for the creation of the new forensic inquiry. Forensic device 12 may, for example, receive case and target device information from user 15 via the user interface. The case information associates the new forensic inquiry with an ongoing case and the target device information specifies a target device of the new inquiry. Forensic device 12 generates a new forensic inquiry based on the data input by user 15 and stores the inquiry information, i.e., case information and target information, in session information 27.

User 15 selects initial acquisition operations for forensic device 12 to perform (50). For example, forensic device 12 may present a set of potential acquisition operations for the newly defined inquiry and user 15 selects a subset, all or none of the initial acquisition operations to be initially performed. For example, user 15 may check a box located adjacent the acquisition operation to select the acquisition operation. As described above, initial acquisition operations include, for example, acquiring log files, communication statistics, e.g., Ethernet and protocol statistics, general system data, running process information, open network ports and associated processes, account information, file sharing information, TCP/IP network information, timeline of file and state changes, and other file or state information.

Forensic device 12 interrogates the target device defined by user 15 to acquire data, i.e., computer evidence, from target computing device 16 (52). More specifically, forensic device 12 communicates commands to the operating system of target computing device 16 via one or more of the access methods defined in the corresponding forensic inquiry. For example, forensic device 12 may communicate commands associated with some acquisition operations to the operating system of target computing device 16 via WMI and commands associated with other acquisition operations to the operating system of target computing device 16 via SMB. Forensic device 12 may perform the initial acquisition operations in a particular order to reduce the impact the operations have on other data stored within target computing device 16.

Additionally, forensic device 12 stores an original copy of the acquired data in an evidence storage database 36, takes a checksum of the acquired data using a cryptographic hash to obtain a "fingerprint" for preserving the authenticity the acquired data, and normalizes the acquired data, i.e., converts the acquired data to a standard format (54).

User 15 may use data analysis tools provided by forensic device 12 to analyze and interpret acquired data, either data acquired by a new forensic inquiry or data acquired in a previous forensic inquiry (56). The data analysis tools may, for example, allow user 15 to analyze log files for tampering by verifying the log file entries are in chronological order, detecting anomalous gaps in the log entries, or detecting the absence of expected periodic log entries. The data analysis tools may also allow user 15 to view data acquired from target computing device 16. User 15 may view the raw acquired data, summaries of the acquired data, or the like. After analyzing and interpreting the acquired data, user 15 may determine whether acquisition of additional data is necessary (58). When user 15 determines additional data is necessary, user 15 specifies additional files or system state data to acquire from target computing device 16 and forensic device 12 acquires the identified data from target computing device 16 (60, 52). Forensic device 12 may acquire additional data from target computing device 16 and allow user 15 to view and analyze the data on-line with the data analysis tools. In this manner, user 15 does not have to go off-line to analyze the acquired computer evidence. In some cases, forensic device 12 may allow user 15 to view and analyze previously acquired computer evidence while forensic device 12 collects additional forensic evidence. In this manner, the collection and analysis of forensic evidence may be done in parallel.

Figure 6:
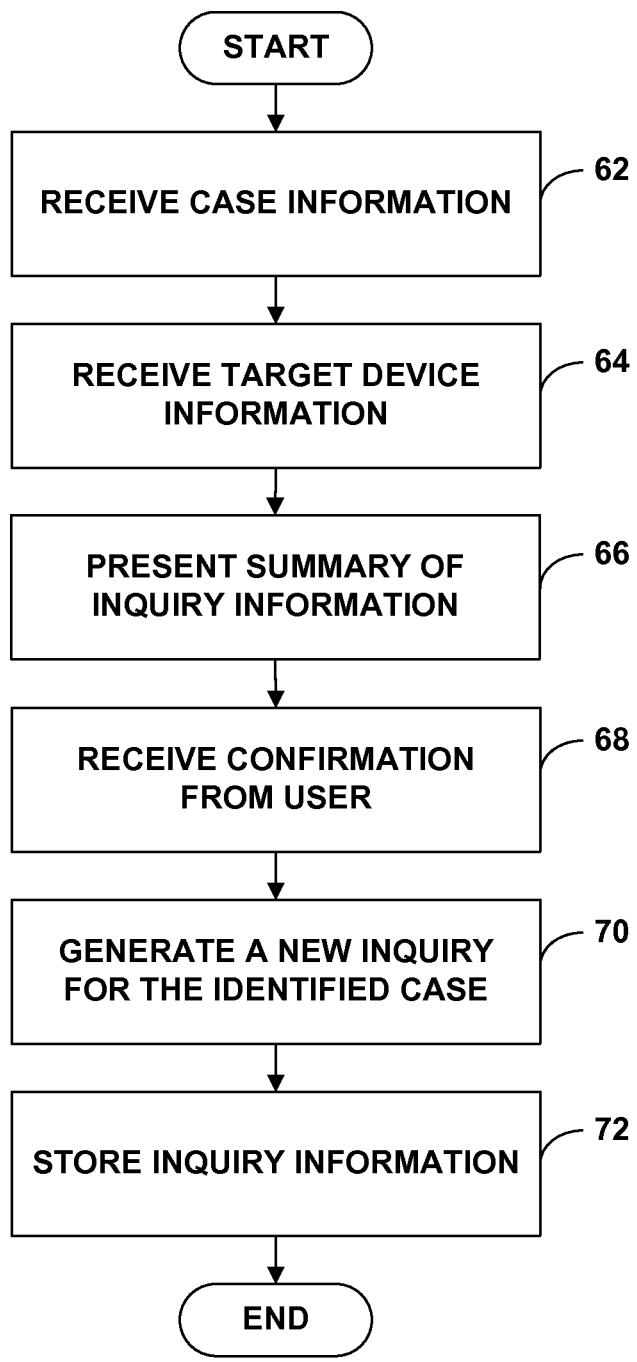
FIG. 6 is a flow diagram illustrating exemplary operation of a forensic device in creation of a new forensic inquiry.

FIG. 6 is a flow diagram illustrating exemplary operation of forensic device 12 creating a new forensic inquiry. Initially, forensic device 12 receives case information and target device information from user 15 via one or more user interfaces (62, 64). Forensic device 12 may present user 15 with a series of user interfaces that include input areas for user 15 to input the case and target device information. Alternatively, forensic device 12 may present user 15 a single user interface, which the user may interact with to input the case information and target device information.

Forensic device 12 presents a confirmation user interface to user 15 that summarizes the inquiry information, i.e., the case and target device information, previously input by user 15 (66). Upon review of the inquiry information summary, forensic device 12 receives a confirmation from user 15 that the data as input is correct (68). Forensic device 12 automatically generates the new forensic inquiry associated with the identified case and stores the inquiry information in session information 27 (70, 72).

Figure 7:
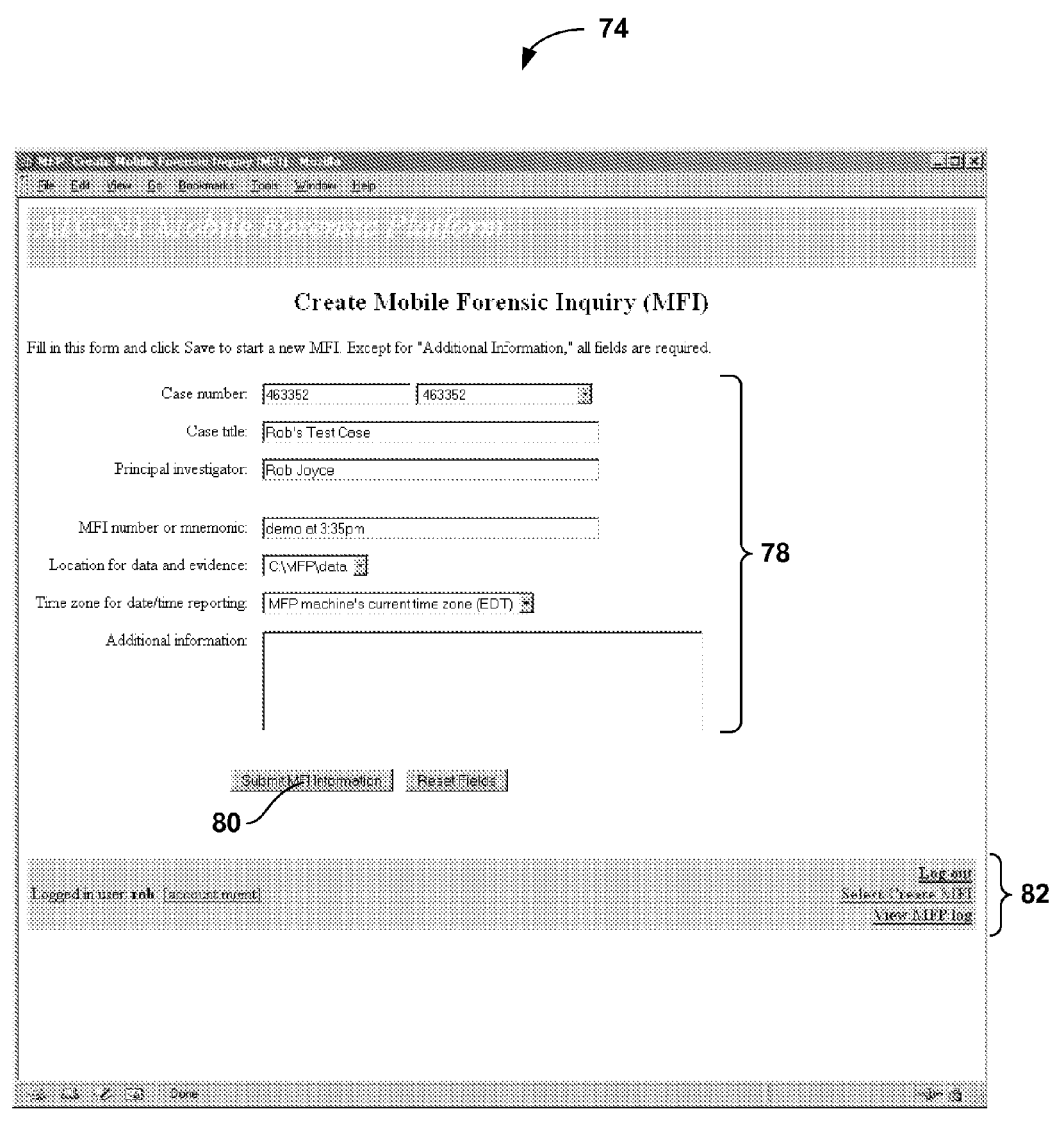
Figure 8:
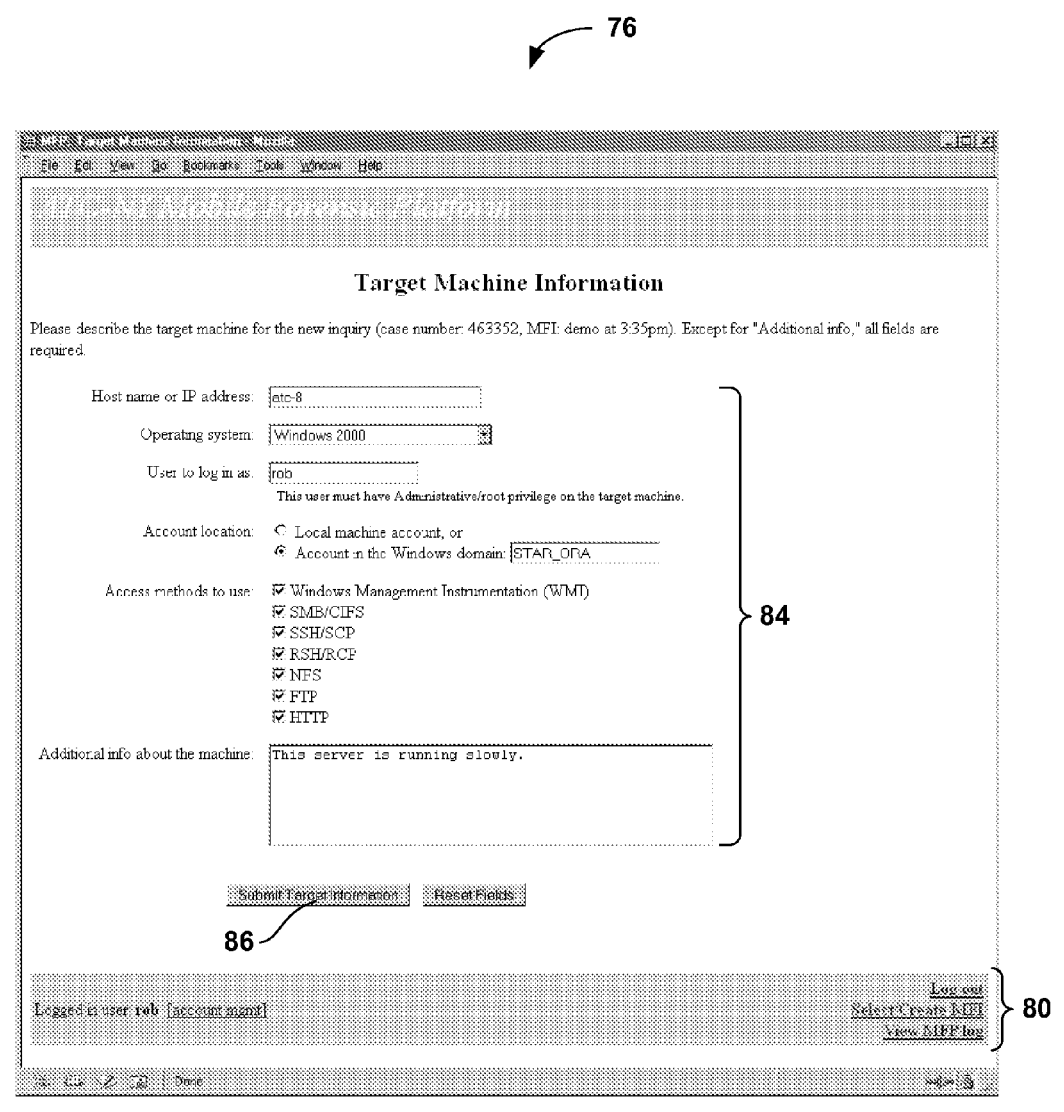

FIG. 7 and FIG. 8 are screen illustrations of example user interfaces with which user 15 interacts to create a forensic inquiry. Specifically, FIG. 7 is a screen illustration of an exemplary user interface 74 that allows user 15 to input case information. FIG. 8 is a screen illustration of an exemplary user interface 76 that allows user 15 to input target device information.

Forensic device 12 may present user interfaces 74 and 76 to user 15 as a series of screens with either one of the screens being presented first. Although illustrated as two separate screens, forensic device 12 may present user 15 a single user interface, which the user may interact with to input inquiry information, i.e., case information and target device information.

User interface 74 includes an input area 78 that includes input boxes for entering the case information. Specifically, input area 78 of user interface 74 includes input boxes for inputting a case number, case title, principal investigator, forensic inquiry number or mnemonic, storage location for data and evidence, time zone for date/time reporting, and additional information. As illustrated in FIG. 7, some of the input boxes may be textual boxes that user 15 inputs text into and others may be pull down menus that provide a list of options. For example, the pull down menu associated with the input box for time zone information may present user 15 with a list of all possible time zones across the world. Upon inputting the case information into user interface 74, user 15 may actuate a "submit information" button 80 to proceed to user interface 76 illustrated in FIG. 8.

User interface 74 also includes an action area 82 that includes links that user 15 can click on to perform different actions. Action area 82 of user interface 74 includes a "log out" link that exits user 15 from forensic device 12, a "select/create" link that takes user 15 to a screen that illustrates a list of all inquiries, and a "view log" link that takes user 15 to an audit log of transactions performed by user 15 or other users of the forensic device 12.

User interface 76 of FIG. 8 includes an input area 84 that includes input boxes for user 15 to enter target device information. Specifically, input area 84 of user interface 76 includes input boxes for inputting a host name or IP address, an operating system, a user to log in as, an account location, one or more access methods to use, and additional information about the target machine. The input boxes of user interface 76, like the input boxes of user interface 74, may be textual boxes that user 15 inputs text into, pull down menus that provide a list of options, or the like. Upon inputting the target device information into user interface 76, user 15 may actuate the "submit target information" button 86 to create the forensic inquiry.

User interface 76 also includes an action area 80 that includes links that user 15 can click on to perform different actions, e.g., a "log out" link that exits user 15 from forensic device 12, a "select/create" link that takes user 15 to a screen that illustrates a list of all inquiries, and a "view log" link that takes user 15 to an audit log of transactions performed by user 15 or other users of the forensic device 12.

Forensic device 12 automatically generates a forensic inquiry in accordance with the case and target device information submitted by user 15. For instance, forensic device 12 generates a forensic inquiry for case number 463352: Rob's Test Case, which has Rob Joyce as a principal investigator. The evidence acquired from target device atc-8 will be stored at C:\MFP\data\463352_demoat335pm_FSCindRA. Target device atc-8 as a Windows® 2000 operating system and forensic device 12 will acquire the data using at least one of Windows Management Instrumentation (WMI), Server Message Block (SMB), Secure Shell (SSH), Remote Shell (RSH), Network File System (NFS), Apple Filing Protocol (AFP), File Transfer Protocol (FTP), and Hypertext Transfer Protocol (HTTP).

Figure 9:
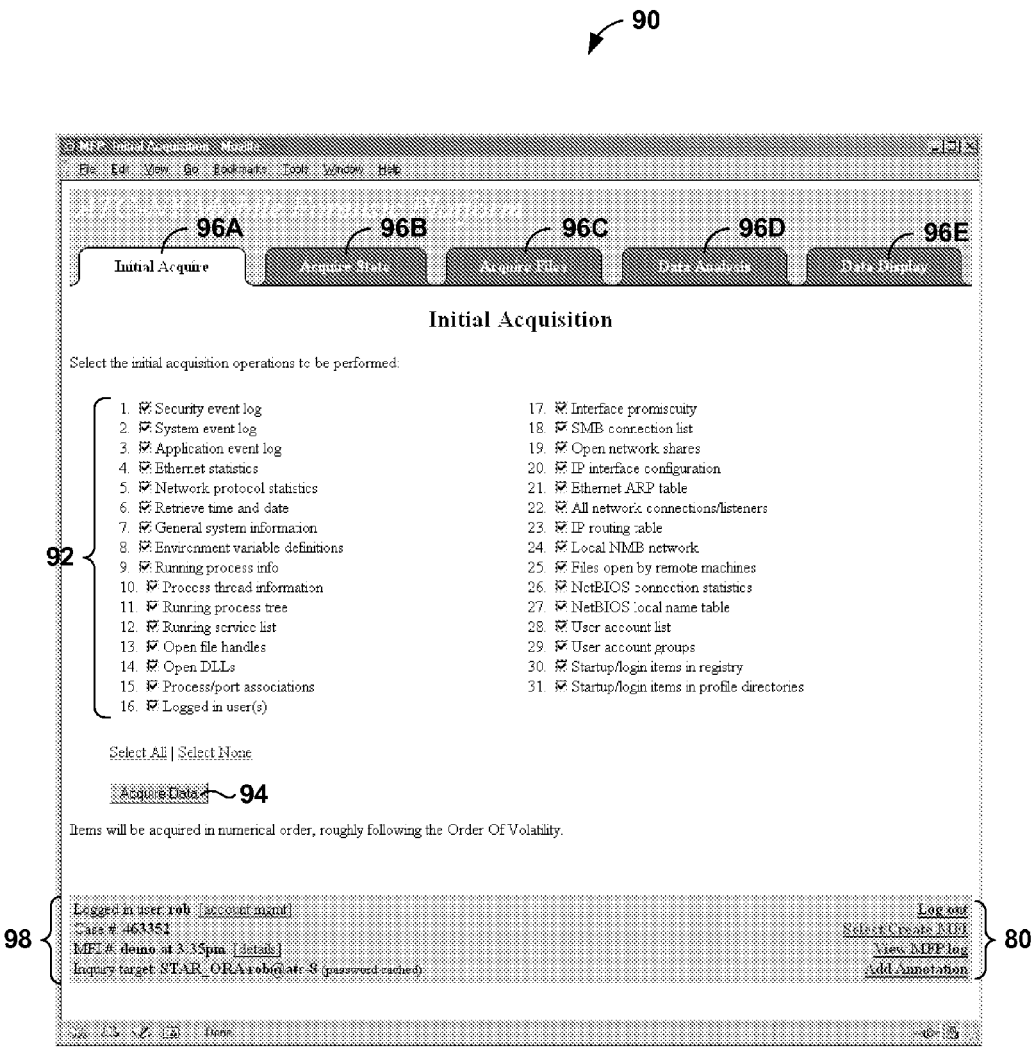
FIG. 9 is a screen illustration of an exemplary user interface with which the remote user interacts to specify a combination of acquisition operations.

FIG. 9 is a screen illustration of an exemplary user interface 90 with which user 15 interacts to specify a combination of one or more acquisition operations for forensic device 12 to perform. User interface 90 includes an acquisition operation selection area 92, which user 15 interacts with to select one or more acquisition operations from the comprehensive set. Acquisition operation selection area 92 includes a list of acquisition operations with a box adjacent each of the acquisition operations. In this embodiment, user 15 clicks on the boxes adjacent the acquisition operations user 15 wants forensic device 12 to perform. In the example illustrated in FIG. 9, user 15 has selected all of the acquisition operations, represented by the check marks within the selection boxes. In some embodiments, acquisition selection area 92 may have different methods for selecting the acquisition operations. For example, the acquisition operation selection area may include a list of acquisition operations and user 15 may drag desired acquisition operations from the list into a "perform acquisition operation" region. Once user 15 has selected the acquisition operations for forensic device 12 to perform, user 15 may actuate an "acquire data" button 94 to initiate the initial data acquisition.

The acquisition operations listed in acquisition selection area 92 may be arranged and presented to user 15 in an order of "volatility" or impact the acquisition operation may have on the target computing device 16. In other words, forensic device 12 may list the acquisition operations according to the order in which the acquisition operations will be performed. As described above, forensic device 12 may perform the acquisition operations in a particular order to reduce the impact the acquisition operations have on other data stored within target computing device 16. Alternatively, the acquisition operations may be presented in no particular order, but upon actuation of acquire data button 94, forensic device 12 may determine an order in which the acquisition operations are performed to reduce the impact the acquisition operations have on other data stored within target computing device 16.

User interface 90 further includes operation mode tabs 96A-96E ("operation mode tabs 96"). Operation mode tabs 96 correspond to different data acquisition and analysis operation modes of forensic device 12. Clicking on one of operation mode tabs 96 presents user 15 a user interface for the data acquisition or analysis operation mode associated with the respective operation tab 96. Particularly, operation tab 96A corresponds to the initial acquisition, operation tab 96B corresponds to acquisition of additional machine state information, operation tab 96C corresponds to acquisition of files from target device 16, operation tab 96D corresponds to data analysis tools for analyzing acquired data, and operation tab 96E corresponds to data viewing tools for displaying acquired data.

User interface 90 also includes an inquiry summary section 98 that illustrates to user 15 inquiry information associated with the forensic inquiry that is currently in session. Inquiry summary section 98 of FIG. 9 identifies the case number, the forensic inquiry mnemonic, and the inquiry target. Additionally, user interface 90 includes an action area 80 that includes links that user 15 can click on to perform different actions, e.g., a "log out" link that exits user 15 from forensic device 12, a "select/create" link that takes user 15 to a screen that illustrates a list of all inquiries, a "view log" link that takes user 15 to an audit log of transactions performed by user 15 or others, a "add annotation" link that allows user 15 to add comments.

Figure 10:
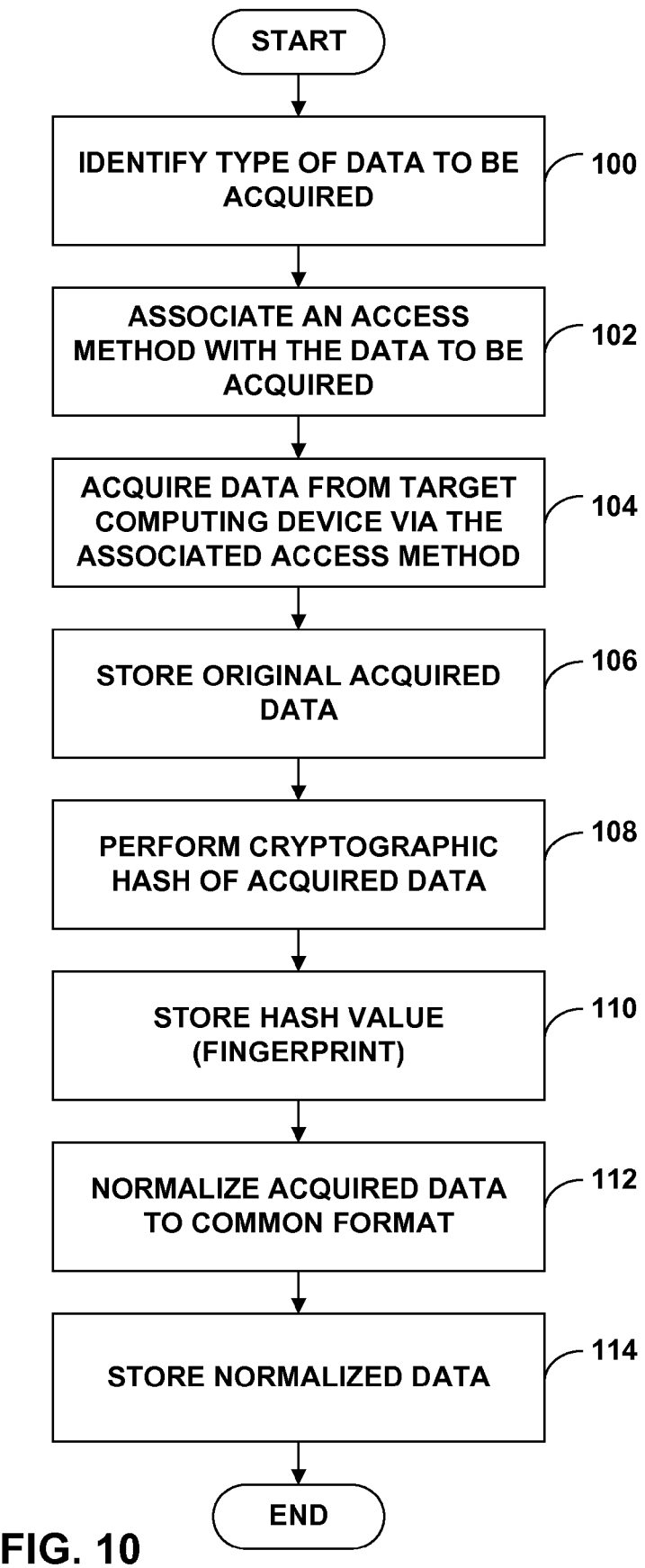
FIG. 10 is a flow diagram illustrating exemplary operation of the forensic device acquiring and storing data from the target computing device.

FIG. 10 is a flow diagram illustrating exemplary operation of forensic device 12 acquiring and storing data from target computing device 16. Initially, forensic device 12 identifies the type of data to be acquired by an associated acquisition operation (100). For example, forensic device 12 may identify that the first acquisition operation is for acquiring a log file. Forensic device 12 associates an access method with the type of data to be acquired by the acquisition operation (102). For instance, forensic device 12 may determine that the most effective access method for acquiring the log file is via WMI. Forensic device 12 acquires the data from target computing device 16 via the associated access method (104). More specifically, forensic device 12 communicates commands corresponding to the acquisition operation to the operating system of target computing device 16 via the access method to acquire the data.

Forensic device 12 stores a copy of the original acquired data in an evidence storage database 36 (106). Additionally, forensic device 12 performs a checksum on the acquired data using a cryptographic hash, such as an MD5 hash, and stores the hash value within evidence storage database 36 (108, 110). The cryptographic hash inputs the acquired data and produces an output "fingerprint" is computationally infeasible to duplicate using a different set of data. In this manner, forensic device 12 may preserve the authenticity of the data. In other words, user 15 can prove the integrity of the data by reapplying the cryptographic hash to the original data to obtain a fingerprint and comparing the fingerprint to the fingerprint taken at the time the data was acquired.

In addition, forensic device 12 normalizes the acquired data, i.e., converts the acquired data to a standard format, and stores the normalized data (112, 114). Normalizing the acquired data allows the analysis tools to work on data acquired from different operating systems, target computing devices running in different time zones, and the like. Forensic device 12 may, for instance, convert timestamp data from a local time zone of target device 16 to a standard time zone, e.g., UTC. In another example, forensic device 12 converts data that has host names and IP addresses to all one format, i.e., either all host names or all IP addresses. Normalization, however, changes the data, which is why acquisition module 28 stores an original copy in evidence storage database 36.

Figure 11:
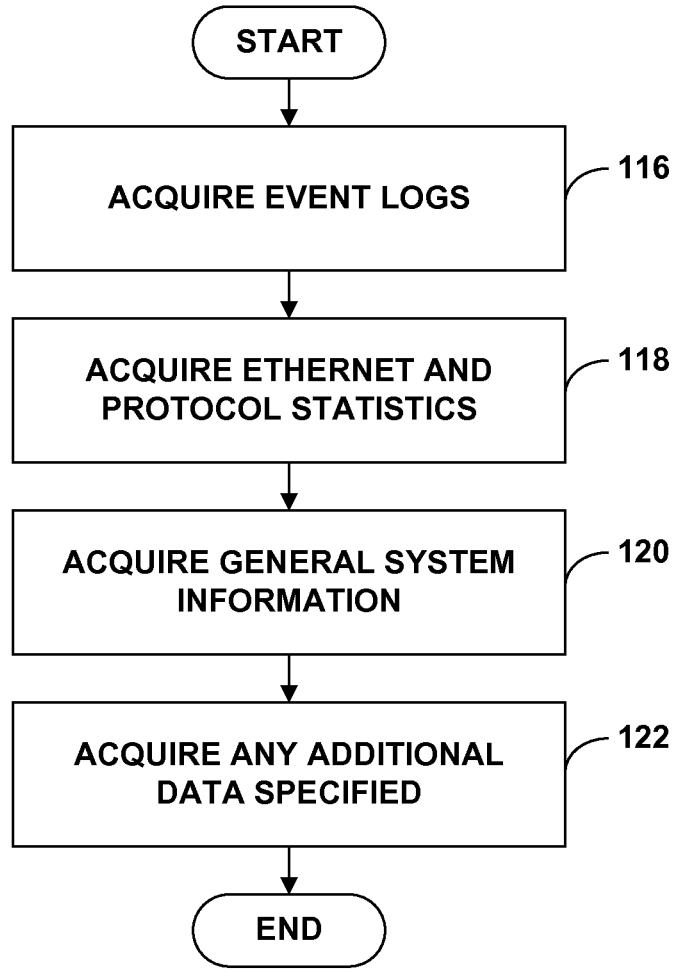
FIG. 11 is a flow diagram illustrating exemplary operation of the forensic device when invoking the specified acquisition in a particular order to reduce the impact the acquisition operations on other evidence.

FIG. 11 is a flow diagram illustrating an exemplary order of operations of forensic device 12 to acquire data from target computing device 16 to reduce the impact the acquisition operations have on other data stored within target computing device 16. In other words, the acquisition operations are performed such that the data that is most volatile is acquired first.

As described above, some acquisition operations may have dependencies on other acquisition operations. In other words, a command associated with one acquisition operation may affect the output of another command associated with another acquisition operation. Forensic device 12 may relay commands associated with the acquisition operations to target computing device 16 in a particular order to reduce the affects of these dependencies.

Initially, forensic device 12 relays commands associated with one or more acquisition operations for acquiring one or more log files (116). More specifically, forensic device 12 communicates the commands to target computing device 16. Forensic device 12 may, for example, relay commands to target computing device 16 to acquire an application log file, security log file, system log file, or a combination thereof. Executing other acquisition operations prior to executing the log file acquisition operation may result in additional log entries due to the other acquisition operations. Further, executing the log file acquisition operation should have no dependence on any future acquisition operations.

Forensic device 12 issues commands associated with the acquisition operations for acquiring communication statistics, e.g., Ethernet and protocol statistics, to target device 16 after performing the one or more log file acquisition operations (118). As described above, executing other acquisition operations prior to the acquisition operations associated with the retrieval of Ethernet and protocol statistics may result in an increase in the statistical numbers retrieved. As with the log file acquisition operations, the acquisition operations associated with acquiring the Ethernet and network protocol statistics should have limited effect on future acquisition operations.

Forensic device 12 relays commands associated with the acquisition operations for acquiring general system information, including time and date, after performing the acquisition operations associated with acquiring Ethernet and protocol statistics (120). Executing other acquisition operations prior to the acquisition operations for acquiring general system information may affect the system uptime, which may be compensated for if necessary. However, for aesthetic reasons, commands associated with acquisition operations to acquire general system information, including time and date, should be executed early in the initial acquisition and have little effect on future acquisition operations.

Forensic device 12 executes the rest of the acquisition operations after acquiring the general system information (122). The additional acquisition operations include acquisition operations for acquiring running process information, open network ports and associated processes, account information, file sharing information, TCP/IP network information, and timeline of file and state changes. A more detailed list of acquisition operations is illustrated in acquisition operations selection area 92 of user interface 90 of FIG. 9.

Although forensic device 12 is described above as executing the acquisition operations in a particular order, forensic device 12 may execute the acquisition operations in a slightly different order while still reducing the affects of the dependencies on the other acquisition operations. For example, the Ethernet and protocol statistics may be obtained prior to the log files. However, the acquisition operations for acquiring running process information, open network ports and associated processes, account information, file sharing information, TCP/IP network information, and timeline of file and state changes should be run after the acquisition operations for acquiring log files, Ethernet and protocol statistics, and general system information.

Figure 12:
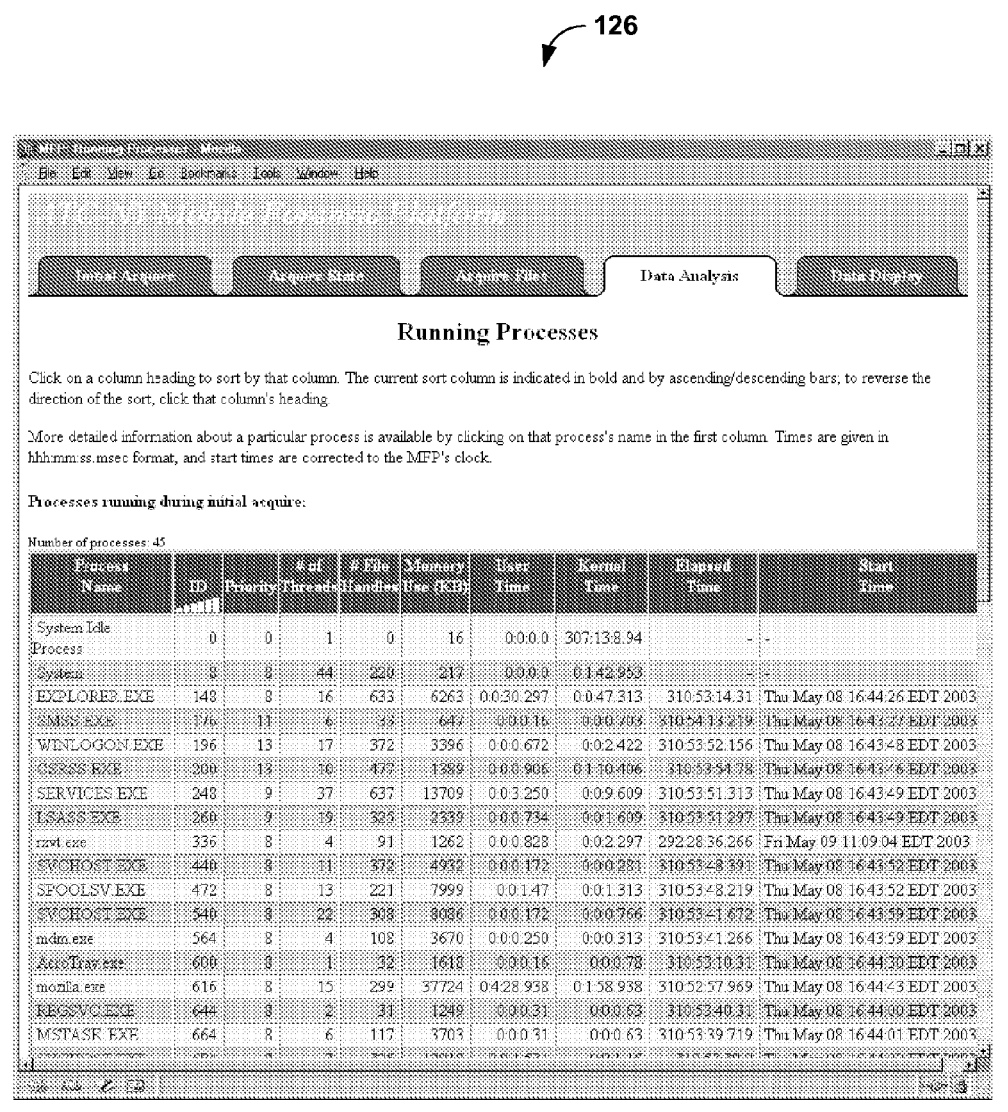

FIG. 12 is a screen illustration of an exemplary user interface 126 for viewing data acquired from target computing device 12. In the example illustrated in FIG. 12, user interface 126 presents running process data acquired from target computing device 16. Specifically, user interface 126 includes a chart that includes a list of processes, and for each process lists an ID and priority, number of threads, number of file handles, memory use in kilobytes, user time, kernel time, elapsed time, and start time. User 15 may click on the process name to obtain more detailed information regarding the process.

Figure 13A:
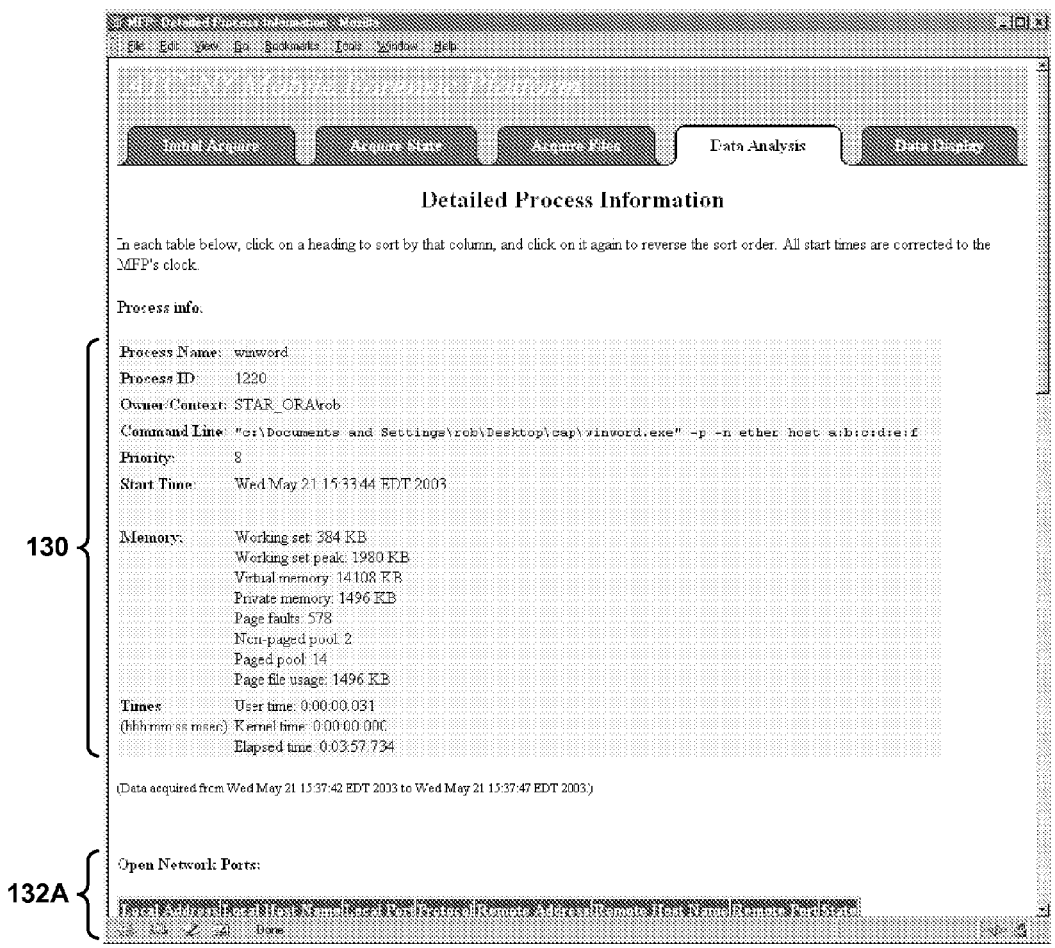
Figure 13B:
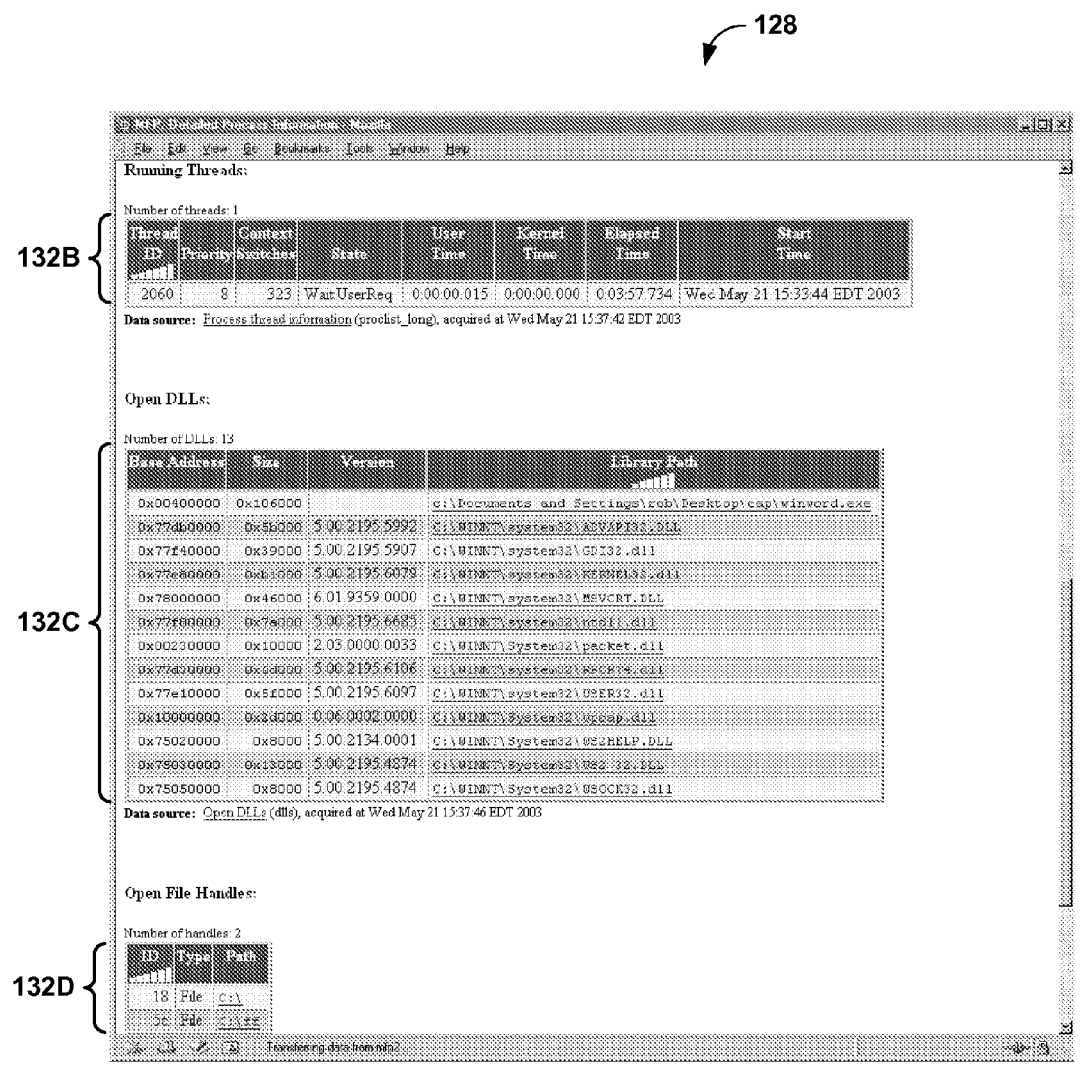

FIGS. 13A and 13B are screen illustrations of an upper and lower portion of an exemplary user interface 128 presented to user 15 upon clicking on a process name in user interface 126. More specifically, in this example, user interface 128 shows process WINWORD in detail. As illustrated in FIG. 13A, user interface 128 includes a process information section 130 that includes process name, ID, owner/context, command line, priority, start time, memory usage, and different times, e.g., user, kernel, and elapsed. As illustrated in FIGS. 13A and 13B, a lower region of user interface 128 shows charts 132A-132D ("charts 132") of different process attributes such as an open network port chart, a running thread chart, open DLL chart, and open file handle chart. User interface 128 may include numerous other charts illustrating other process attributes, such as an open network port chart.

Figure 14:
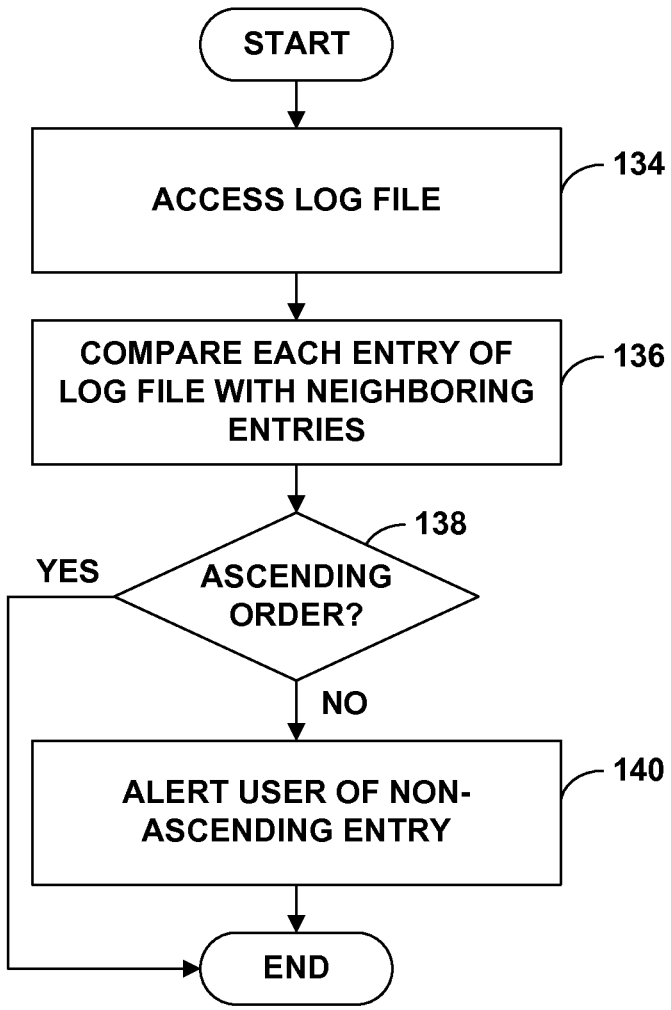
FIG. 14 is a flow diagram illustrating an exemplary analysis script for detecting log file tampering.

FIG. 14 is a flow diagram illustrating an exemplary analysis script for detecting log file tampering of a log file acquired from target computing device 16. Initially, forensic device 12 accesses a log file acquired from target computing device 16 (134). Forensic device 12 compares each of the entries of the log file with neighboring entries, i.e., the entry immediately prior to and immediately following the entry of interest (136). Based on the comparison, forensic device 12 determines whether the entries are in ascending order, i.e., chronological order (138). When the entries are in chronological order, forensic device 12 continues on to the next entry and compares the entry with the neighboring entries until all of the entries of the log file have been verified to be in ascending order. However, when entries within the log file are determined to be out of ascending order, forensic device 12 alerts user 15 of the non-ascending entries (140). Forensic device 12 may, for example, display the non-ascending entries to user 15.

Figure 15:
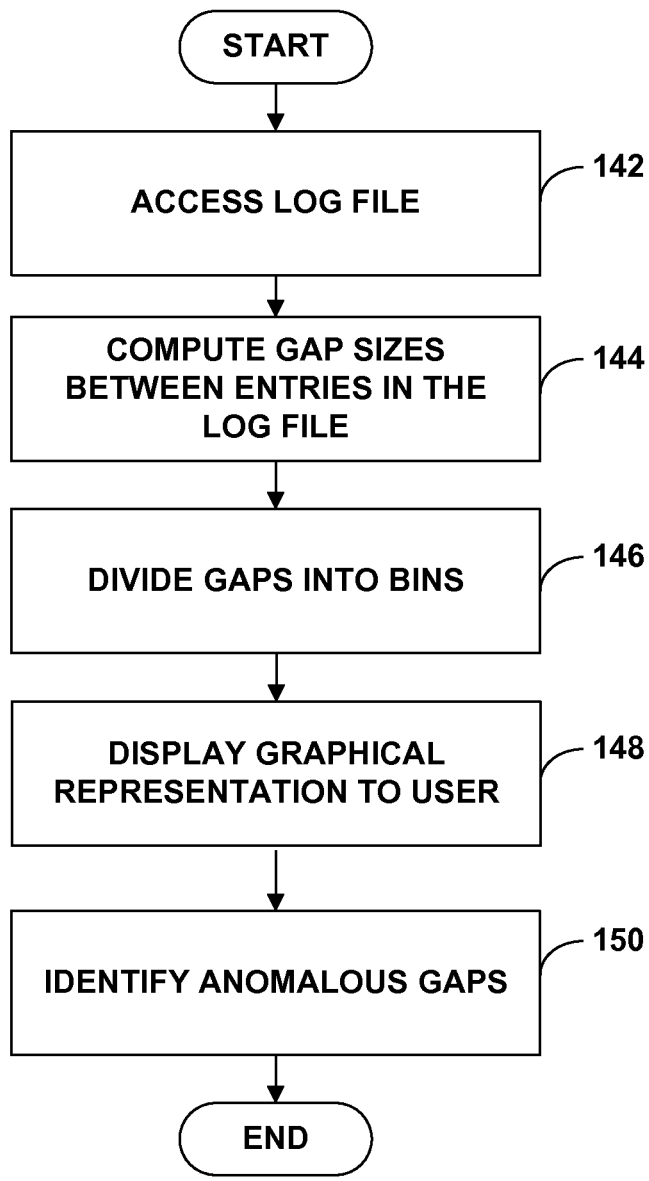
FIG. 15 is a flow diagram illustrating another exemplary analysis script for detecting log file tampering.

FIG. 15 is a flow diagram illustrating another exemplary analysis script for detecting log file tampering. Initially, forensic device 12 accesses a log file acquired from target computing device 16 (142). Forensic device 12 computes the amount of time that elapsed, i.e., gap size, between each of the entries of the log file (144). Forensic device 12 divides the data into "bins" (146). The term "bins" refers to a set of ranges of gap sizes into which each computed gap size is classified. In one embodiment, each of the bins is of equal size on a logarithmic scale and is determined dynamically based on the ranges of the gap sizes. Forensic device 12 may divide the data into bins according to the equation $$\text{Bin\#=floor}(((\log(\text{gap}_i)-\log(\min))/(\log(\max)-\log(k)))*\text{bins}_{max}), \quad (1)$$

wherein min is the dynamically calculated minimum gap size, max is the dynamically calculated maximum gap size, $\text{bins}_{max}$ is the maximum number of bins, k is the minimum number of the smallest bin, and $\text{gap}_i$ is the $i^{th}$ gap size (gap of interest). $\text{Bins}_{max}$ and k may be preconfigured values or values that are specified by user 15 upon executing the analysis script.

Forensic system 12 displays a graphical representation of the gap sizes to user 15 (148). The graphical representation may, for example, comprise a histogram illustrating the number of gaps that are in each of the bins. User 15 identifies anomalous gaps based on the histogram (150). Alternatively, forensic system 12 may include logic to determine the existence of anomalous gaps. For example, a typical server may be generating log file entries every 5-10 seconds, and once per second during busy periods. If an intruder were to delete a 5 minute section of the log file entries, the gap analysis results would make that deletion stand out.

Figure 16:
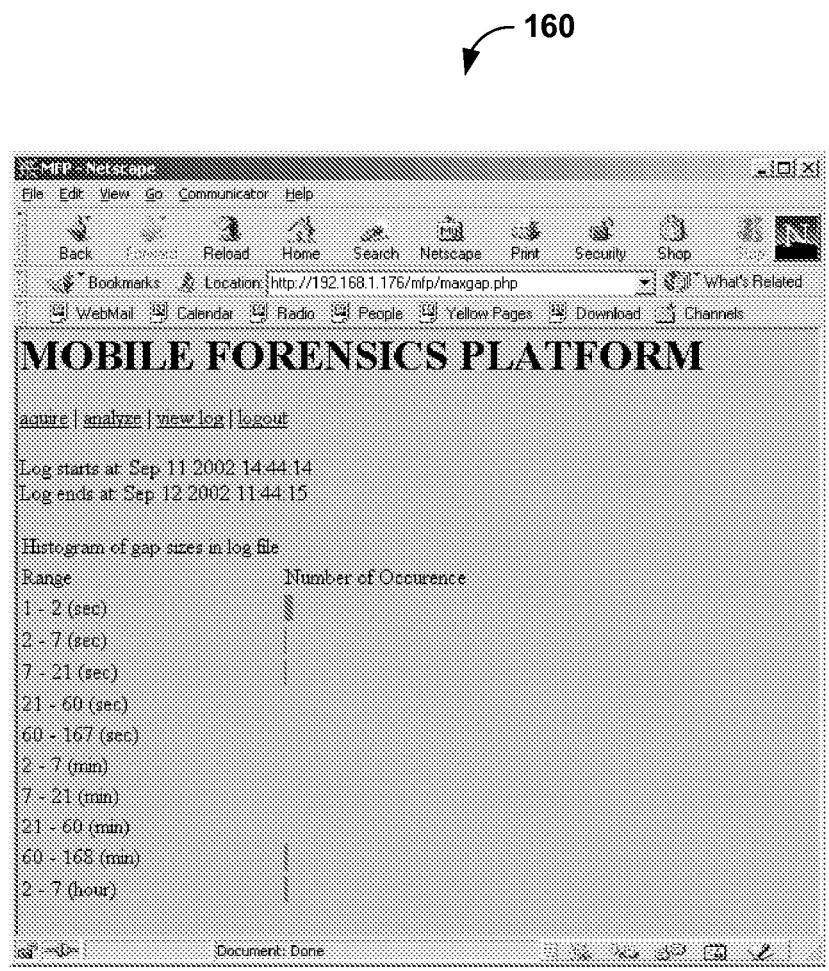
FIG. 16 is a screen illustration of an exemplary user interface that presents a histogram of gap sizes created using a gap analysis software module.

FIG. 16 is a screen illustration of user interface 160 that presents a histogram of gap sizes created using the gap analysis tool. The example user interface 160 of FIG. 16 shows a clear bimodal behavior in which part of the time the machine was active and the gaps were spaced together closely, within 10-20 seconds, and the rest of the time the machine was idle with large gaps (over one hour). If an intruder were active for a few minutes and then erased his activity, the anomalous gap would likely stand out. In this example, the log file had very few entries for exemplary purposes. Nonetheless, user 15 can get a visual representation of the structure of the log files and may be able to detect anomalies.

Figure 17:
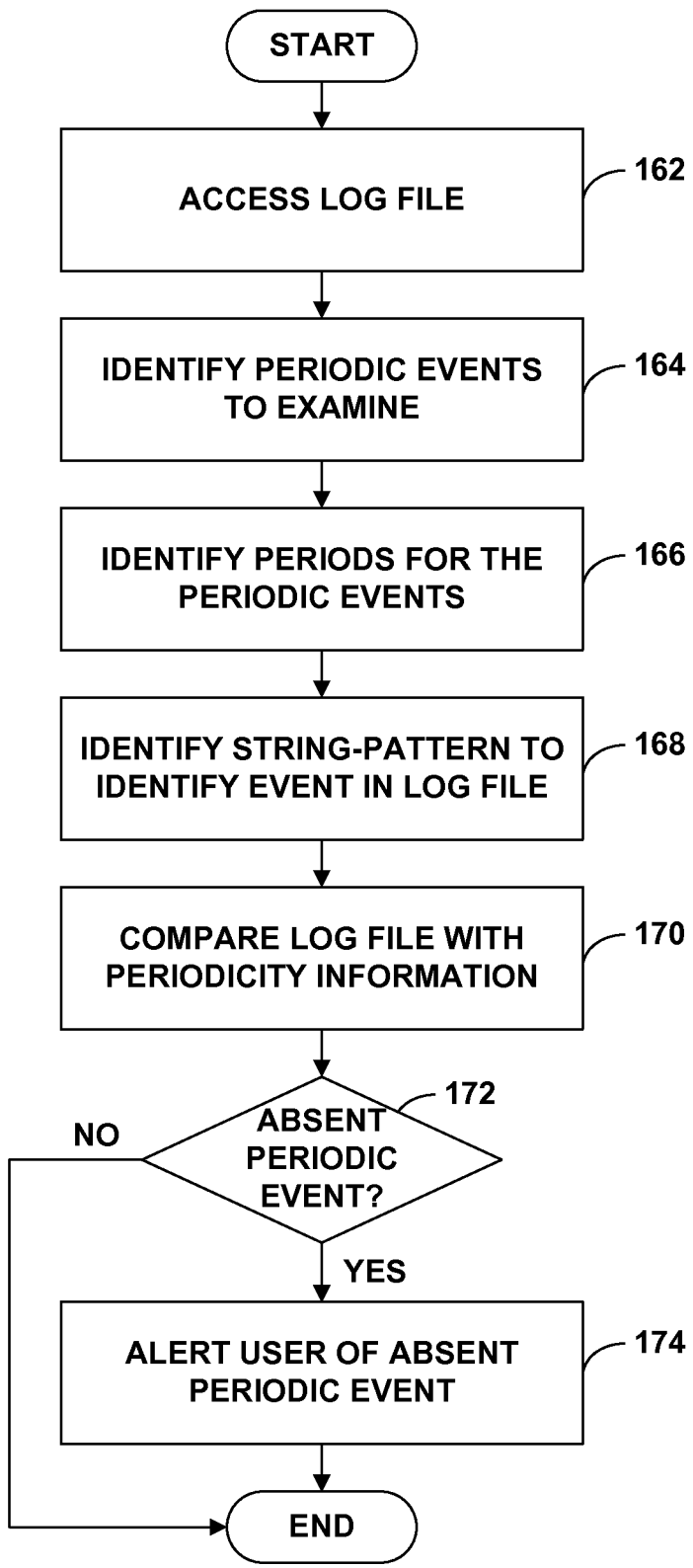
FIG. 17 is a flow diagram illustrating another exemplary analysis script for detecting log file tampering.

FIG. 17 is a flow diagram illustrating another exemplary analysis script for detecting log file tampering. Initially, forensic device 12 accesses a log file acquired from target computing device 16 (162). Forensic device 12 receives input from user 15 identifying a periodic event to examine (164). User 15 may, for example, input an event identifier, such as a string-pattern or other character recognition, to identify entries in the log file corresponding to the periodic event and an expected period of the periodic event.

Forensic device 12 searches the log file for entries matching the identified periodic event, computes the period since the last occurrence of the event, and compares the period with input from user 15 to determine whether there are any periods in which an expected periodic event was absent (166, 168). When forensic device 12 identifies an absent period, forensic device 12 notifies user 15 of this absent periodic event (170, 172). Alternatively, forensic device 12 may present a graphical representation of the entries of the log file that match the event identifier input by user 15 and allow user 15 to determine any absent periodic events. In this manner, user 15 examines log files to ensure that certain events that should occur regularly, do in fact occur at the appropriate intervals.

In this way, a forensic device allows a user, such as an investigator or network administrator, to remotely interrogate a target computing device in order to collect and analyze computer evidence that may be stored on target computing device. This form of live forensic analysis is able to provide investigators with new sources of information. In some cases, the amount of data can be overwhelming. Described in the remainder of this document is an innovative method of monitoring the resource use of running software processes to build a profile of the application's normal resource use. This resource usage profile, described herein as an "application profile," is then accessed by the forensic device and used to filter out extraneous, forensically uninteresting data from the collected evidence that matches the resources listed in the application profile. Exemplary privileges that may be required by a program include operations on particular files (e.g., certain application DLLs or system data files), registry keys, and network addresses. In some cases a dramatic reduction in the data regarding computer resources (e.g., open files, registry handles, loaded DLLs and the like) presented to the investigator can be achieved, thereby aiding the investigator in identifying any relevant digital forensic evidence.

More specifically, techniques are described for generation of an application profile that describes an aggregate exercise of privileges by a software program. An empirical privilege profiler (EPP) system is described that generates an application profile based on empirical information captured during execution of an instance of a software application (i.e., software program) by a plurality of client devices. The profile may be empirically generated over a wide range of individual computers, operating systems, file systems, sites, and software versions. Specific privileges exercised by multiple instances of the same program are correlated to create an abstraction of each privilege. That is, names and usage of computer resources are correlated to identify names and variants that are "commonly" used by a threshold number of distinct client devices. In one embodiment, each resource is classified as application-specific, resource-specific, or per-process.

The application profile may be viewed as an empirically formed, abstract composite of information describing the privilege requirements of the deployed instances of the software application. Any single instance of the program may well use less privilege than the composite profile; however, the composite profile specifies a reasonable minimum, and quite possibly less privilege than that granted to the particular instance of the program during default installation. In other words, a profile generated from executions of the program will approximate the minimum privilege exercised by the program as used by that organization.

As one example, an EPP system may reside within an enterprise computer network using an EPP server to generate the profile dynamically using deployment of the application throughout the enterprise. The EPP server may couple to a plurality of client devices, each including instrumentation that captures empirical information relating to the exercise of privileges by an instance of the particular application being profiled. Typically, this instrumentation is referred to as a software "wrapper." A user may interact with one of the client devices to load and execute an instance of an application using the client device's operating system. During execution of the application instance, the software wrapper captures and logs any function calls to the operating system kernel. The client device may also include an upload module to transmit the log to the EPP server.

Upon receiving the client log, a privilege profiler module included within the EPP server may extract privilege usage information from the log that describes in an abstract manner the exercise of privileges by the application instance. In one embodiment, the privilege profiler conceptually represents each exercised privilege as a sequence of tuples: <ProgramPoint, Resource, {AccessRight}>. That is, each tuple identifies that at a given program point, the particular instance of the software application accessed a certain named resource (e.g., a particular file as specified by a precise filename or a specific registry key). Each ProgramPoint captures or approximates the location in the application that exercises the privilege and the operating system operation that grants the privilege. In one embodiment, the profiles need not specify the particular access rights exercised but simply the ProgramPoint and the particular resource being accessed. The program point may be represented as an N-gram characterization, i.e., a substring formed from the sequence of N kernel calls the program made to reach the particular request for accessing the resource.

After aggregating profile information from various application instances executing on the client devices, the privilege profiler correlates the abstract privilege tuples according to their characterization. The abstract nature of the tuples facilitates correlation across varying client devices that execute instances of the application and that maintain different system resources. Once correlated, the privilege profiler module generates the application profile as a list of these abstract, characterized, and correlated tuples.

In this manner, one example embodiment utilizes collaboration between the EPP server and client devices, to generate application-specific profiles using techniques of empirical abstraction, characterization, and correlation. In this example, the EPP server may transmit the application profile in the form of a filter to any forensic devices installed within enterprise computer network. Alternatively, the EPP server may maintain and continuously update a filter database of application profiles for access by forensic devices when needed.

As another example, the profiles may be pre-generated offline without requiring connectivity to an enterprise environment. For example, the profiles may be generated and distributed by a third-party organization for installation on the forensic devices in the form of selectable filters. In this example, the enterprise network need not include an EPP server and the client devices of the enterprise network need not include an upload module to transmit logs or other information to an EPP server.

Unlike conventional forensic analysis tools that allow the investigator to filter using only static patterns and expressions, the techniques described herein allow the forensic device to filter forensic data using an aggregate application profile generated by observing a running software program across many different users from many different client devices. The profiles may be pre-generated for common software applications and installed on mobile forensic devices in the form of a filter or may generated in real-time using an EPP system capable of observing client devices presently operating in the same enterprise environment as the target computer. In any case, significantly improved filtering can be achieved over the conventional forensic analysis techniques, which are tedious and error prone and require the investigator to know the filtering criteria ahead of time.

Figure 18:
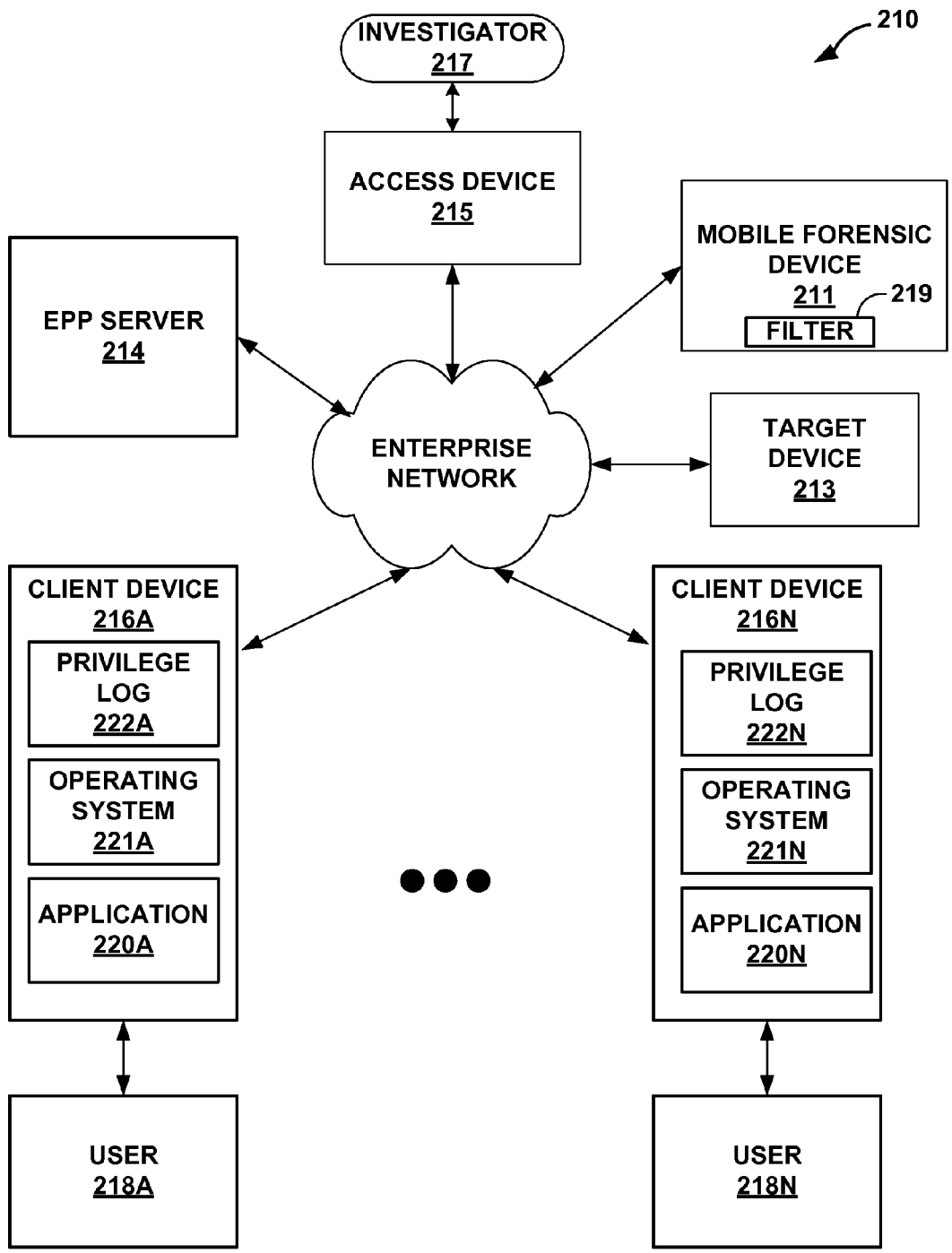
FIG. 18 is a block diagram illustrating an exemplary enterprise computer network that dynamically generates an application privilege profile in accordance with the principles of the invention.

FIG. 18 is a block diagram illustrating an exemplary enterprise environment 210 having a forensic device 211 that allows an access device 215 operated by an investigator 217 or network administrator, to remotely interrogate a target computing device 213 in order to collect and analyze computer evidence that may be stored on target computing device 213. As described above, forensic device 211 allows investigator 217 to acquire the computer evidence from target computing device 213 with a reduced impact on target computing device 213. For example, target computing device 213 need not be physically seized or otherwise "shut down" in order to acquire the computer evidence.

In one example embodiment, enterprise environment 210 dynamically generates an application privilege profile 212 ("profile 212") for installation on mobile forensic device 211 as filter 219 for filtering data retrieved from target computing device 213 in accordance with the principles of the invention. For example, mobile forensic device 211 and/or access device 215 may receive profile 212 from empirical privilege profiler server 214 ("EPP server 214") and store the profile as filter 219 to filter data collected from target computing device 213 using an aggregate application profile generated in real-time by EPP server 214 based on observation of software programs running across many different client devices 216A-16N ("client devices 216") presently operating in the same enterprise environment 210 as the target computing device.

As another example, the profiles may be pre-generated offline without connectivity to enterprise environment 210. That is, the profiles may be pre-generated for common software applications and installed on mobile forensic device 211 as one or more filters 211. In this way, the profiles generated for the different software applications may be portable for use for filtering forensic evidence collected from different target devices and different enterprise networks.

As shown in the example of FIG. 18, enterprise computer network 210 includes an EPP server 214 and a plurality of client devices 216 coupled to EPP server 214 by one or more networks. Client devices 216 may, for example, include a wide-range of individual computers, file systems, sites, and software versions. Users 218A-18N ("users 218") interact with a respective one of client devices 16 via a keyboard, mouse, touch screen, or other computer input device to cause their respective one of client devices 16 to execute a respective instance of a software program application 20A-20N ("application instances 220").

While described in reference to enterprise computer network 210, the principles of the invention may apply to any computer network, such as a public network or the internet. Thus, the embodiments or implementations of the techniques described herein are merely an exemplary implementation, and the claims should not be strictly limited this particular embodiment. Also, although not illustrated in FIG. 18, in some embodiments, users 218 may comprise processes, scripts, or the like executing within client devices 216 and controlling application instances 220, and the inventions should not be limited to strictly human users.

In the example shown in FIG. 18, enterprise network 210 includes EPP server 214, which may comprise one or more of application servers or any other type of computing device capable of sending and receiving information to client devices 216 and executing EPP software. Client devices 216 may each comprise one of a personal computer, a laptop, a workstation, a personal-digital assistant (PDA), a wireless device, a network-ready appliance, or other devices. Typically, each of client devices 216 comprises a personal computer executing operating system 221A-221N ("operating systems 21"), such as Windows™ from Microsoft Corporation, Linux, Unix, Mac OS from Apple Computer, or any other operating system that provides a suitable environment for executing respective applications instances 220. Each of operating systems 221 comprises an instance of a single platform, or operating system, such as one of the above described operating systems. For example, operating system 21A may be one instance of the Unix operating system, and operating system 21N may be another instance of the same Unix operating system. Applications instances 220 each represent a separate instance of the same enterprise software program, such as Microsoft Outlook, Notepad, Microsoft Word, Windows Calculator, or netsh (a Windows command line network configuration application).

Initially, users 218 may log into their respective client devices 216 by entering a username and password. After logging in, each of users 218 may cause client devices 216 to execute respective application instances 220 via interactions with one of the above described computer input devices. Next, client devices 216 launch and execute application instances 220. During execution of respective application instances 220, client devices 216 log kernel calls issued to the operating systems 221 by respective application instances 220.

When logging the kernel calls, the client devices record the exercise of any resources by the application instances 220 to respective privilege log files 222A-22N ("privilege log files 222"). Upon either termination of its respective application 220, in response to an event, or at some set interval of time, client devices 216 upload their respective privilege log files 222 to EPP server 214. In other embodiments, each of client devices 216 may upload its privilege log file 222 immediately to EPP server 214 upon making a change to the respective privilege log file 222, whereupon EPP server 214 updates aggregation privilege information for the client devices 216.

Once uploaded, EPP server 214 processes each of privilege log files 222 to dynamically generate an empirical privilege profile, i.e., profile 212, for installation as filter 219 that describes the aggregate exercise of system-level privileges by application instances 220. In some embodiments, EPP server 214 may process privilege log files 222 in real-time.

In one example embodiment, profile 212 and therefore filter 219 comprises an application-specific list of tuples that describe the system resources necessary to execute respective application instances 220. In one embodiment, the EPP server 214 conceptually represents each exercised privilege as a sequence of one or more tuples: {<ProgramPoint, Resource, {AccessRight}>}. That is, each tuple identifies that at a given program point, the particular instance of the software application accessed a certain named resource (e.g., a particular file as specified by a precise filename or a specific registry key). Each ProgramPoint captures or approximates the location in the application that exercises the privilege and the operating system operation that grants the privilege. In another embodiment, profile 212 and filter 219 need not specify the particular access rights exercised but simply the ProgramPoint and the particular resource being accessed.

EPP server 214 may characterize each tuple of the list of tuples within application profile 212 into three distinct categories of privileges: constant, variable, and not-yet-categorized privileges. Constant privileges include hard coded privileges, or privileges specified in the source code of application instances 220, that application instances 220 must receive in order to execute within client devices 216. An example constant privilege may include a privilege to read an initialization file found at a constant memory address within client device 16. A variable privilege includes user-specified privileges, such as privileges to open and edit a file dynamically created by one of users 218. A not-yet-categorized privilege is a privilege that EPP server 214 was unable to characterize due to a lack of empirical data or, in other words, a lack of sufficient log file information. Once finished generating profile 212, EPP server 214 transmits profile 212 to mobile forensic device 211 via the enterprise network for installation as filter 219 for filtering digital forensic information collected from target device 213.

As another example, the profiles may be pre-generated offline without requiring connectivity to enterprise environment 210. For example, the profiles may be generated and distributed by a third-party organization and installed on mobile forensic device 211 in the form of selectable filters 219. In this example, enterprise network 210 need not include an EPP server 214 and the client devices 216 of the enterprise network need not be modified in any way, e.g., need not include an upload module to transmit logs or other information to an EPP server.

Figure 19A:
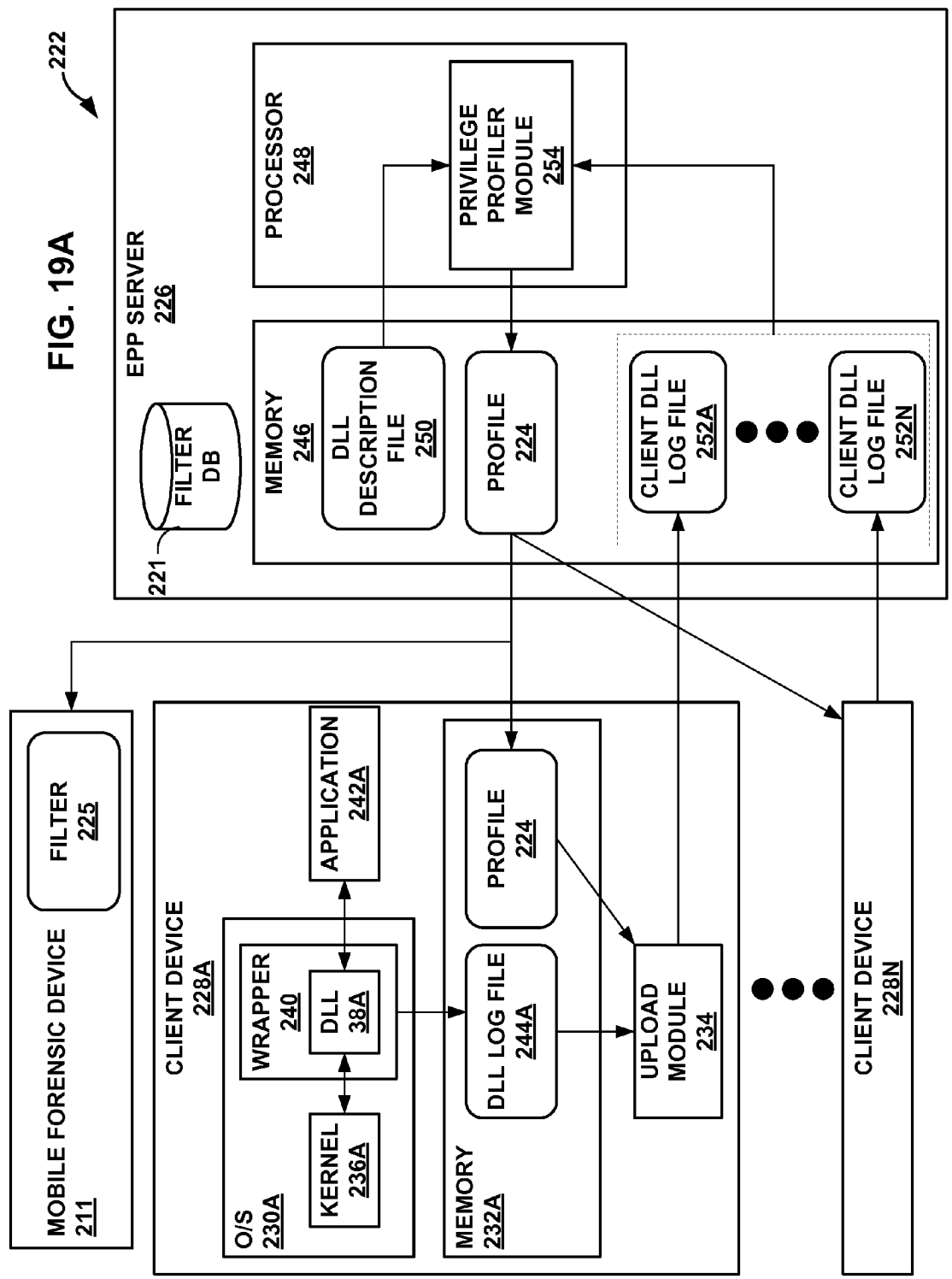
FIG. 19A is a block diagram illustrating in more detail another exemplary enterprise computer system that dynamically generates an application-specific privilege profile according to the principles of the invention.

FIG. 19A is a block diagram illustrating in more detail another exemplary enterprise computer system 223 that dynamically generates an application-specific privilege profile 224 ("profile 224") and filter 225 according to the principles of the invention. Enterprise computer system 223 may be substantially similar to enterprise computer system 210 of FIG. 18 in that enterprise computer system 223 also includes an EPP server 226 and client devices 228A-28N ("client devices 228"). Although client devices 228B-28N are not fully illustrated, they may be substantially similar to client device 28A and may include substantially similar components to those described below in reference to client device 28A.

As shown in FIG. 19A, client device 228A includes an operating system 230A ("O/S 230A"), a memory 232A, and an upload module 234. O/S 230A may comprise one of the Windows operating systems, such as Windows XP or Windows NT, a Unix operating system, a Linux operating system, a Mac operating system by Apply Computers, or any other operating system that includes a kernel requiring system-level privileges. Memory 232A may comprise one or more of static memory, such as a hard drive, flash memory, and/or electrically erasable programmable read-only memory (EEPROM), and dynamic memory, such as random access memory (RAM), dynamic random access memory (DRAM), and/or a cache. Upload module 234 may comprise hardware, software, or both to enable client device 228A to upload files to EPP server 226.

O/S 230A includes a kernel 236A and a kernel interface module 238A encased by a software wrapper 240 ("wrapper 240"). In some embodiments, wrapper 240 encases more than just one kernel interface module 238A and may encase all kernel interface modules (not shown in FIG. 2A) to which an instance of an application 242A ("application instance 242A") make calls. Application instance 242A may invoke functions included within kernel interface module 238A in order to interface with kernel 236A of O/S 230A. Kernel 236A represents one or more core modules of O/S 230A responsible for memory, process execution, and I/O interface management. Kernel interface module 238A represents a system-level software module providing an API that software applications, such as application instance 242A, may call in order to interface with kernel 236A and thereby access system resources known to and controlled by O/S 230A. Wrapper 240 comprises a layer of software introduced into client device 228A so as to capture calls to kernel 236 by way of kernel interface module 238A.

As one example, O/S 230A may be a Windows operating system, kernel 236A may be the Windows operating system kernel, and kernel interface module 238A may be a Windows digital link library, such as ntdll.dll. Application instance 242A may comprise one of many types of software discussed above in reference to application instances 220 of FIG. 18. This configuration is described below as one example so as to illustrate the principles of the invention. As another example, O/S 230A may be a UNIX operating system, kernel 236A may be the UNIX operating system kernel, and kernel interface module 238A may be a system call interface. Thus, the principles of the invention should not be limited to strictly DLLs, system call interface, or any other particular type of kernel interface module but may include other operating system kernel reference structures or simply the kernel itself. In other embodiments, the principles of the invention may be applied such that profiles are generated with respect to a platform, such as the Java Virtual Machine platform, as described herein.

Memory 232A represents data memory or possibly persistent storage used to store log file 244A and profile 224. Wrapper 240 generates log file 244A and, in one embodiment, writes the log in accordance with the extensible markup language (XML). Log file 244A represents a privilege log, and includes information describing each kernel call to kernel interface module 238A by application instance 242A. Thus, log file 244A comprises an application-specific and client-specific log of calls to kernel interface module 238A.

An exemplary log file 244A may comprise expressions in the following notional grammar:
PrivilegeUses::={PrivilegeRequirement}+
PrivilegeUse::=<Resource>:{ConditionalAccessRightSet}
ConditionalAccessRightSet::=<Condition>→{<AccessRight>}

That is, application instance 242A's use of privilege is denoted in a sequence (i.e., in braces) of one or more instances of that privilege use. Each instance of privilege use describes the use of a single resource. As another example, log file 244A may record a list of operations on named resources, such as file operations on files with specific names.

In the example shown, profile 224, as described above, can be generated so as to describe aggregate access to resources of client devices 228 by application instances 42. While only shown to contain a single log file 244A and a single profile 224, multiple DLLs may be wrapped, and memory 232A may store multiple application profiles similar to profile 224. Each additional application profile (not shown) corresponds to a different application. As one example, computer device 228A may execute and profile multiple applications similar to application instance 242A, and wrapper 240 may generate distinct log files for each application that accesses kernel interface module 238A.

EPP server 226 is shown in simplified form as having a memory 246, or other storage medium, and a processor 48. Memory 246 stores a privilege description file 250, profile 224, and copies of client log files 252A-52N ("client log files 252"). In some embodiments, client log files 252 comprise an exact copy of respective log files 244A-44N (only log file 244A shown in FIG. 19A). In other embodiments, client log files 252 comprise a subset of the descriptions logged in log files 244A-244N. In either embodiment, EPP server 226 may store client log files, similar to client log files 252, for other applications, and although these additional log files are not shown in FIG. 19A, the principles of the invention should not be limited as such. Processor 48 is a CPU that provides an execution environment for executing a privilege profiler software module 254 that accepts as input privilege description file 250 and client log files 252, and generates profile 224 based on these inputs As discussed above, profile 224 may be pre-generated offline without requiring connectivity to an enterprise environment. For example, all or portions of the components of FIG. 19A may be implemented by a third-party profile 224 for generation of profile 224 for common software applications so that the profiles can be installed as filter(s) 225 for installation on mobile forensic device 211.

Referring again to the example of FIG. 19A, in this case a network administrator initially configures enterprise computer system 223 to enable client devices 228A to log calls to kernel interface module 238A. Specifically, the network administrator may install and configure wrapper 240 and upload module 234, such that wrapper 240 generates log file 244A, and upload module 234 uploads log file 244A to EPP server 226. The network administrator also configures EPP server 226 by loading privilege description file 250 and privilege profile module 254.

Once configured, users, such as users 218 of FIG. 18, may log into client devices 228. For example, user 218A may log into client device 228A by entering a username and password at a sign-in screen provided by O/S 230A. Once logged in, O/S 230A may assign user-specific privileges to user 218A, thereby limiting user 218A's access to certain resources. Through interactions with client device 228A, user 218A may direct O/S 230A to launch and execute application instance 242A.

In executing application instance 242A, O/S 230A may grant certain system-level privileges to application instance 242A that may be utilized by application instance 242A. For example, application instance 242A may comprise a word processor program, and O/S 230A may allocate file manipulation privileges, such as file open, file read, file write, and file delete privileges, to application instance 242A. User 218A may interact with application instance 242A to open a file, thereby requiring application instance 242A to invoke a file open function defined within kernel interface module 238A. The file open function may require that application instance 242A exercise the file open privilege, and wrapper 240 logs the corresponding function call(s) to log file 244A. Wrapper 240 may log one or more of the functions being invoked and its arguments, including the contents of any file handles or other nested structures, a return status, i.e., whether the function call succeeded, values of any passed-by-reference structures after the call completes, any access tokens, the program counter of the caller, and the program counter of the last call from application instance 242A to kernel interface module 238A.

During execution of application instance 242A, wrapper 240 may continue to log all function calls to kernel interface module 238A or may only log those that require privileges to log file 244A. Upon user 218A terminating execution of application instance 242A, wrapper 240 may close log file 244A and stop logging function calls to kernel interface module 238A. Upon either the closing of log file 244A or according to some pre-defined upload schedule configured by the network administrator, upload module 234 may upload log file 244A to EPP server 226 or may otherwise save the log file to a file system for subsequent analysis. In some embodiments, upload module 234 may first compare profile 224, if it exists, to log file 244A to determine if application instance 242A invoked any new system-level privileges or privileges previously characterized as not-yet-categorized within profile 224. In instances where new or not-yet-categorized privileges were invoked, upload module 234 may upload only these new or not-yet-categorized privileges to EPP server 226. In other embodiments, upload module 234 may make no comparison to profile 224 and instead load the entire log file 244A to EPP server 226. In either embodiment, upload module 234 may load a portion of or the entire log file 244A to EPP server 226, as represented by client log file 252A. In one embodiment, the wrapper 240 need not log the particular access rights exercised but simply the approximate location of the application that performed the operation and the particular resource being accessed.

In the example of FIG. 19A, once EPP server 226 receives a sufficient number of client log files 252 from client devices 228, privilege profiler module 254 may process client log files 252. In other embodiments, privilege profiler module 254 may process client log files 252 in real-time whenever one of client devices 228 uploads one of client log files 252.

Figure 19B:
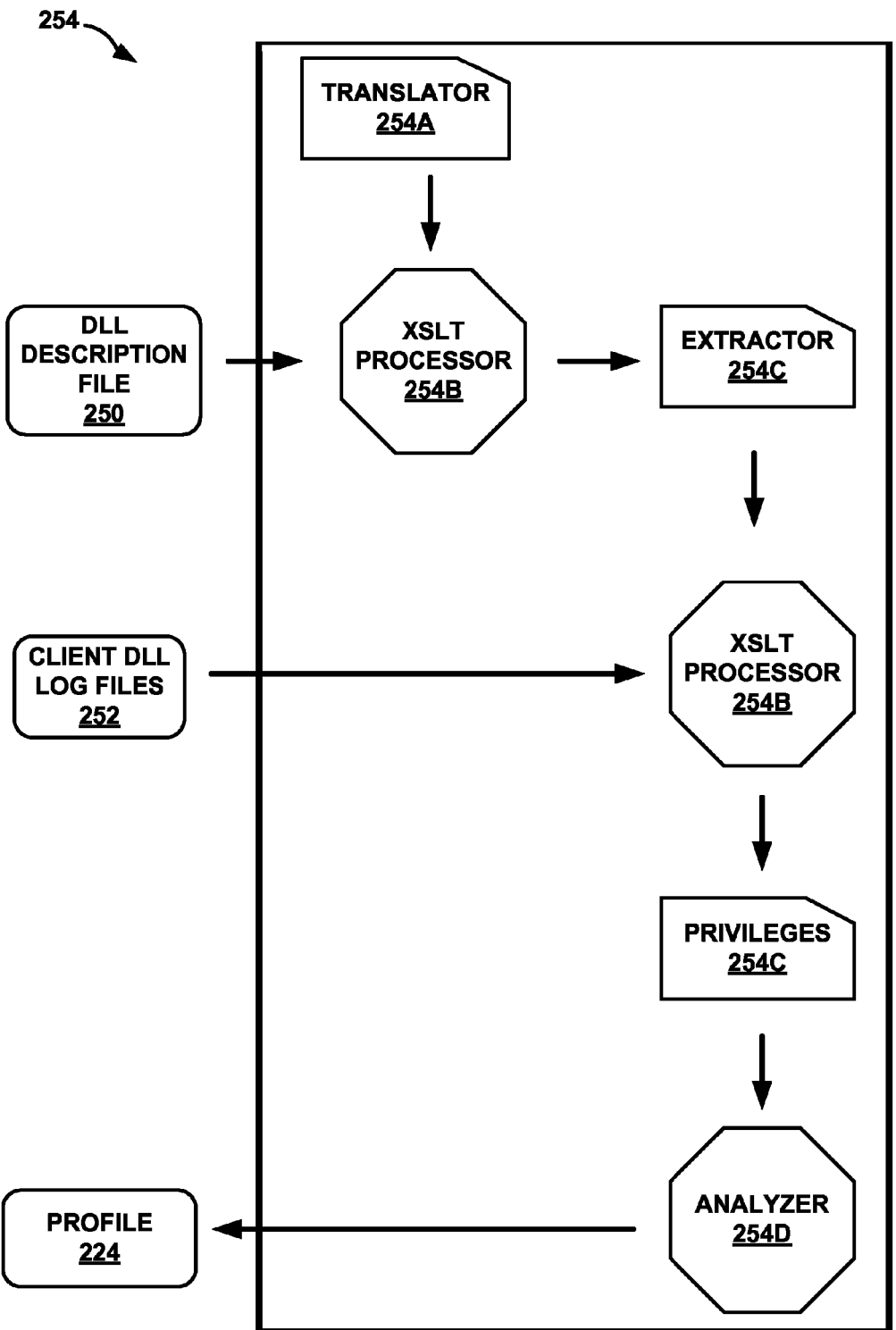
FIG. 19B is a block diagram illustrating an exemplary embodiment of the conceptual framework that applies knowledge about OS privileges in a privilege description file to the client log files.

FIG. 19B shows one embodiment in which privilege profiler module 254 includes extensible style language transformation (XSLT) processor 254B for processing client log files using programming scripts writing in accordance with the XSLT programming language. In a first stage, XSLT processor 254B executes a translator XSLT script 254A to translate privilege description file 250 into the second XSLT script, extraction rules 254C. That is, translator 54A processes privilege description file 250 into a set of rules for extracting privilege information from recorded kernel calls.

Privilege description file 250 comprises a description of the privileges required to execute operations defined within kernel 236A. For example, a privilege exercised by an application instance on a particular resource can be expressed as a set of conditional access rights (see "ConditionalAccessRightSet"). A set of conditional access rights is a set of access rights subject to a condition. In the illustrated embodiment, because kernel interface module 238A provides an interface to kernel 236A, privilege description file 250 comprises a description of the privileges required to execute operations defined by kernel interface module 238A that reference kernel 236A. In other embodiments where operating system 230A comprises a Unix operating system, for example, privilege description file 250 describes application calls to the Unix kernel directly. In yet other embodiments, the principles of the invention may be applied to platforms, such as the Java Virtual Machine platform, wherein privilege description file 250 describes calls to the Java Virtual Machine. Typically, privilege description file 250 encodes the description in accordance with XML specifications.

Privilege profiler module 254 subsequently uses extraction rules 254C as an input to XSLT processor 254B, which in turn, utilizes extraction rules 254C as a rule-basis for extracting abstract tuples from client log files 252, thereby producing privilege files 254D that abstractly characterize the tuples recorded in respective client log files 252. These tuples are "abstract" in that they do not relate to any one computer, user, or site. Privilege profiler module 254 applies extraction rules 254C to client log files 252 to generate privilege tuples in the following format:

{<ProgramPoint, Resource, {AccessRight}>}, where braces denote sets of items.

In determining the tuples, extraction rules 254C of privilege profiler module 254 determine the tuples by first extracting the program point at which a call to kernel interface module 238A occurred from client log files 252. Second, extraction rules 254C determine the tuples by extracting the resource accessed by the function call from client log files 252. Third, extraction rules 254C extract the access rights required to exercise a successful function call from client log files 252. Again, because each of client log files 252 originates from different client devices 228, that may maintain varying resources, XSLT processor 254B generates an abstract, or resource-independent, tuple according to the rules defined in extraction rules 254C such that analyzer 254E can correlate the determined tuples regardless of which one of client devices 228 generated client log file 252 from which the tuple originated.

In order to provide abstract tuples, XSLT processor 254B applies extraction rules 254C to determine the program point such that it is independent of the client device. For example, extraction rules 254C may cause XSLT processor 254B to determine the program point by combining the program counter at which the request originates with the point in kernel interface module 238A that accesses the resource. Thus, an abstracted, platform-independent program point may be defined by the following program point tuple:

<ProgramCounter, Operation>, where ProgramCounter represents the program counter at which application instance 242A relinquished control to a kernel interface module, either immediately to kernel interface module 238A or to an intermediate kernel interface module (not shown in FIG. 2A). Alternatively, in some embodiments, XSLT processor 254B applies extraction rules 254C not to determine a program counter, but to determine an offset from the beginning of the program file. In other embodiments, XSLT processor 254B applies extraction rules 254C to determine a hash of code adjacent to that which invoked the operation. These embodiments may be preferred in instances where the application instance has been relocated in a memory, such that the program counters would be meaningless, while the offset or hash would enable the described functionality. The Operation represents the name of the function defined by kernel interface module 238A that application instance 242A ultimately invoked.

After forming abstract tuples by defining platform-independent program points, XSLT processor 254B writes the tuples to privilege files 254D, where each of privilege files 254D correspond to one of client log files 252. Analyzer 254E characterizes and correlates the tuples stored within respective privilege files 254D. Analyzer 254E may use other information obtained from the binary program file(s) to obtain information about specific resources, such as files, registry keys, or ports, but for ease of illustration purposes, only constant strings are discussed herein. Typically, in generating analyzer 254E, EPP server 226 or a human being may scan the binary code of application instance 242A in search of these constant strings and configure analyzer 254E such that it stores these constant strings. Thus, privilege profiler module 254 may quickly characterize as constant any resource defined by the constant string.

To determine variable privileges, analyzer 254E of privilege profiler module 254 may initially characterize all resources accessed by non-constant strings as not-yet-categorized. However, upon determining that multiple tuples include the same program points and access rights, analyzer 254E may correlate them into a single tuple characterizing a single abstract resource. Analyzer 254E may also reference profile 224 in order to possibly characterize those tuples stored to profile 224 and characterized as not-yet-categorized. During characterization, analyzer 54D may further discard redundant tuples found in privilege files 254D.

Once characterized, analyzer 254E writes these characterized tuples to profile 224. Once privilege profile module 254 finishes writing tuples to profile 224, EPP server 226 transmits a copy of profile 224 to mobile forensic device 211 for installation as filter 225 for use in filtering collected forensic evidence. As another example, EPP server 225 writes the profile out to a file for subsequent transfer and installation on mobile forensic device 211 as filter 225. Further, privilege profiler module 254 may also store the generated profile 224 to filter database 221, which operates as a filter repository accessible via mobile forensic device 211. Privilege profile module 254 may continuously receive and process log files 252 to update filter database 221 with current application profiles for access by mobile forensic device 211 when needed.

In addition, EPP server 226 may optionally communicate profile 224 to each of client devices 228, as represented by profile 224 stored in memory 232A, for a variety of additional uses. For example, upon receiving profile 212, users 218 of client devices 216 may utilize profile 212 to determine or set system security, privilege management policies, and/or adherence to the Principle of Least Privilege, to facilitate detection of whether an instance of application 20 requires excessive privileges. Moreover, profile 212 may facilitate the development of privilege management policies by enabling the system administrator to minimize privileges granted to user in order to execute application instances 220. As another example, developers may utilize profile 212 to determine whether an application in development adheres to the Principle of Least Privilege. Thus, enterprise computer system 10 facilitates adherence to the Principle of Least Privilege, thereby possibly providing more stable and secure computer networks through better privilege management. Client device 28 may incorporate additional hardware and/or software (not shown in FIG. 19A) to enforce profile 224, thereby preventing an attacker from altering application instance 242A so as to gain additional privileges that may pose a security risk. As another example, client device 228A may include developer tools that allow user 218A to determine whether an application under development, e.g., application instance 242A, adheres to the principle of least privilege.

In one embodiment, privilege profiler module 254 need not include all of the components illustrated in the example of FIG. 19B. For example, in simplified form privilege profiler module 254 need not be XSLT based and includes only an analyzer 254 with logic for processing client DLL log files 252 for producing profile 224 that specifies the program location and the particular resource being accessed.

Figure 20:
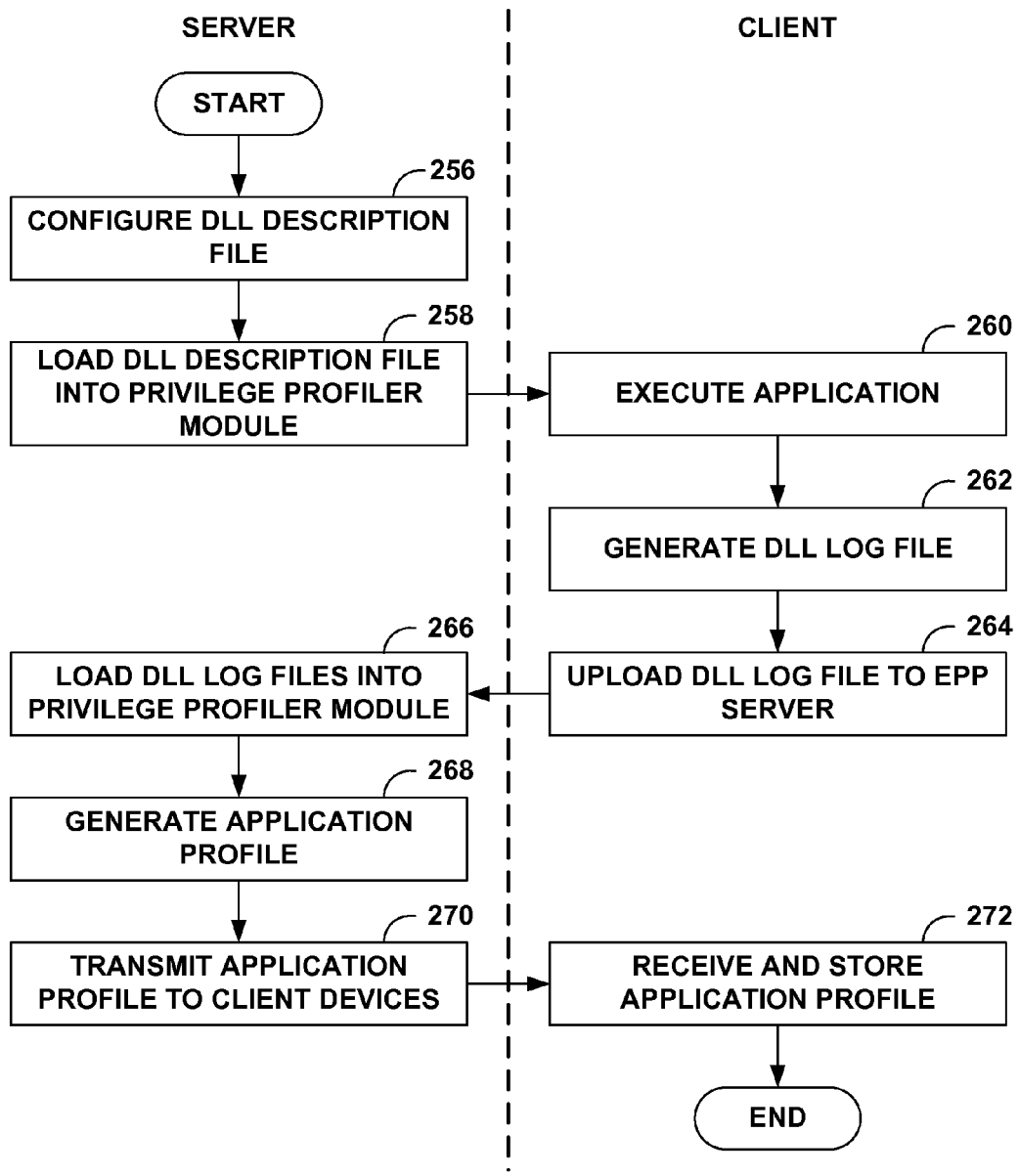
FIG. 20 is a flowchart illustrating exemplary operation of an enterprise computer network in which an EPP server dynamically generates an application-specific, system-level privilege profile in accordance with the principles of the invention.

FIG. 20 is a flowchart illustrating exemplary operation of an enterprise computer network, such as enterprise computer network 222 of FIG. 19A, in which an EPP server dynamically generates an application-specific, system-level privilege profile, such as profile 224, in accordance with the principles of the invention. For purposes of illustration, the flowchart of FIG. 20 will be described in reference to the components shown in FIG. 19A, although the method may be implemented on different devices and within a different context, e.g., a public network instead of a private enterprise network, from that illustrated in FIG. 19A.

Initially, the network administrator may load privilege description file 250 into privilege profiler module 254 of EPP server 226 (258), thereby causing processor 48 to generate extraction rules 254C within privilege profiler module 254. After generating extraction rules 254C, privilege profiler module 254 may wait a specified amount of time or until a collection of client log files 252 exists before generating a new profile 224.

On the client-side, the network administrator may also configure client devices 228 to log calls to kernel interface module 238A by installing wrapper 240 and upload module 234, as described above. Once the network administrator configures client device 228A, a user, such as user 218A of FIG. 1, may log into O/S 230A of client device 228A and interact with O/S 230A to cause it to load and execute application instance 242A (260). During interactions between application instance 242A and user 218A, application instance 242A may call functions specified in kernel interface module 238A, which in turn, triggers wrapper 240. Wrapper 240 analyses the call and gathers the information described above. Wrapper 240 logs the above described information relating to the call, thereby generating log file 244A (262). In some embodiments, wrapper 240 does not log the call unless the call requires O/S 230A to exercise a privilege.

Once generated, upload module 234 may upload the log file to EPP server 226, as represented by client log file 252A (264). Upload module 234 may only upload deviations from profile 224, if memory 232A stores profile 224, as described above. Once uploaded, privilege profiler module 254 may determine that sufficient client log files 252 exist to warrant generating a new profile 224. Alternatively, privilege profiler module 254 may routinely generate a new profile 224 according to a schedule set by the network administrator. Regardless of the triggering event, XSLT processor 254B loads and processes client log files 252 according to extraction rules 254C to determine the abstract tuples described above and store these abstract tuples to respective privilege files 254D (266). Analyzer 254E characterizes these abstract tuples stored to privilege files 254D and correlates the now characterized abstract tuples to generate profile 224, as described above (268).

Once it finishes generating profile 224, EPP server 226 may transmit the newly generated profile 224 to mobile forensic device 211 and optionally each of client devices 228 replacing the old profile 224 stored within memory 232A (270). Mobile forensic device 211 receives and stores the newly generated profile 224 as filter 225 for use in filtering digital forensic evidence collected from the targeted computing device 213 (272). In addition, each of client devices 228 may receive and store the newly generated profile 224 for use in monitoring security and/or development concerns, as described above (272). In this manner, through collaboration between EPP server 226 and client devices 228, application-specific privilege profiles, such as profile 224, may be generated using techniques of empirical abstraction, characterization, and correlation.

As discussed above, in a different embodiment the profiles are pre-generated and installed on the forensic devices in the form of selectable filters. In this example embodiment, functions described with respect to reference numerals 256, 258, 264, 270 and 272 need not necessarily be performed. That is, an EPP server need not be used and client devices need not upload or otherwise transmit logs or other information to a centralized EPP server but rather write the logs to files for subsequent analysis.

Figure 21:
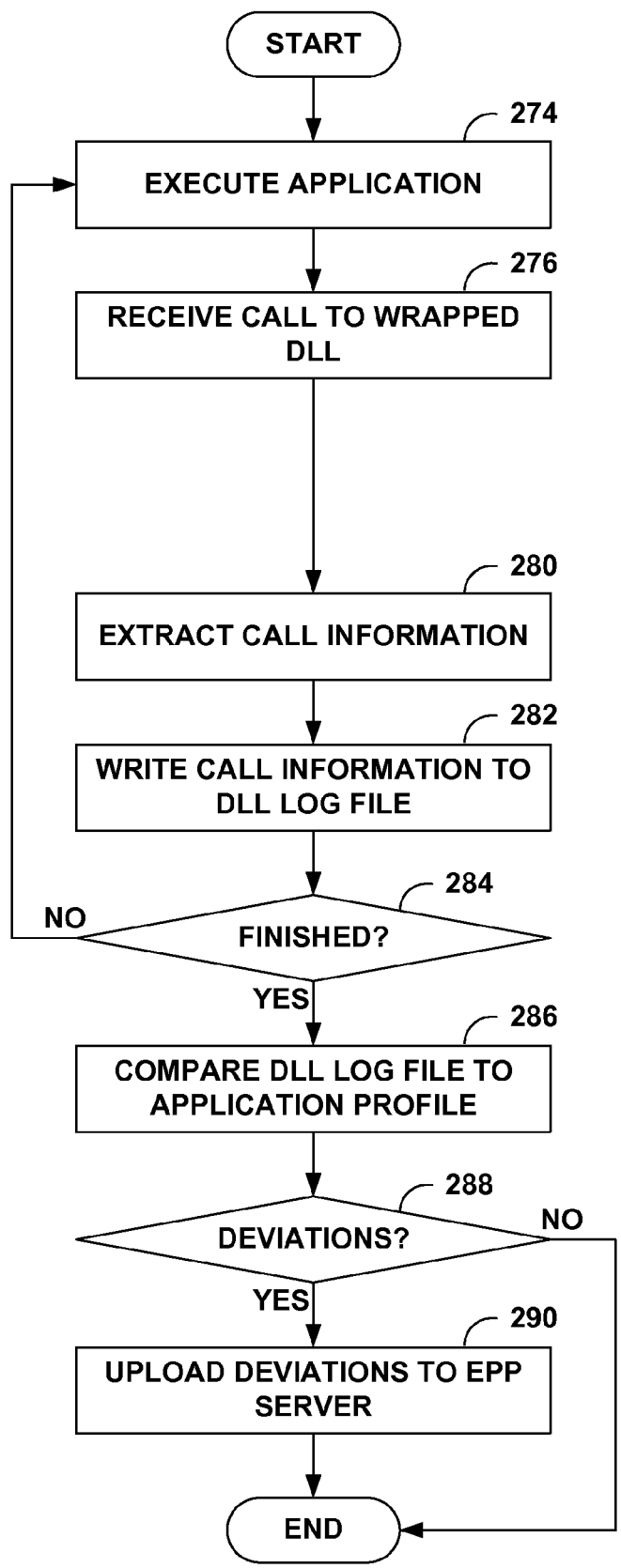
FIG. 21 is a flowchart illustrating exemplary operation of a client device in capturing and logging information for use in generating an application-specific, system-level privilege profile.

FIG. 21 is a flowchart illustrating exemplary operation of a client device, such as client device 228A of FIG. 19A, in capturing and logging information for use in generating an application-specific, system-level privilege profile, such as profile 224. For purposes of illustration, the flowchart of FIG. 21 will be described in reference to FIG. 19A, although the method may be implemented on different devices and within a different context, e.g., a public network instead of a private enterprise network, from that illustrated in FIG. 19A.

To begin capturing information relating to calls to functions of kernel interface module 238A, a network administrator typically installs both wrapper 240 and upload module 234, as described above. Moreover, in a typical enterprise computer network, a user, such as user 218A of FIG. 1, logs into O/S 38A prior to interacting with O/S 38A. Once logged in, user 218A may interact with O/S 38A and cause it to load and execute application instance 242A (274).

While executing, application instance 242A may call functions specified within kernel interface module 238A, which resides within wrapper 240 (276). For example, user 218A may interact with application instance 242A to open a user-specified file with a path and filename of "C:\files\foo\bar.doc." Application instance 242A may invoke a file_open function specified by kernel interface module 238A and pass in the "C:\files\foo\bar.doc" string as a parameter to the function. The function may require that application instance 242A have certain privileges to access the specified file, and application instance 242A either has those privileges or the function fails. Wrapper 240 intercepts this open file function call, extracts the call information described above, and writes this information to log file 244A (280, 282). In some embodiments, wrapper 240 may first determine whether the function call requires a privilege, and only log those that require a privilege. Once logged, wrapper 240 continues to log kernel interface module 238A function calls until user 218A exits application 42 ("NO" 284, 274-284).

In the event user 218A terminates execution of application instance 242A ("YES" 284), upload module 234 may compare log file 244A to profile 224 (286). If update module 234 determines there are new or previously not-yet-categorized privileges, i.e., deviations, between log file 244A and profile 224 ("YES" 288), upload module 234 uploads these deviation logs of log file 244A to EPP server 226. However, if there are no deviations ("NO" 288), upload module 234 does not upload any portion of log file 244A to EPP server 226. In this manner, client device 228A may capture and log information relating to privileged function calls using wrapper 240 and upload module 234.

In a different embodiment in which the profiles are pre-generated and installed on the forensic devices in the form of selectable filters, functions described with respect to reference numerals 286-290 need not necessarily be performed. For example, the client device need not compare the DLL log file to an application profile and upload any deviations a centralized EPP server.

Figure 22:
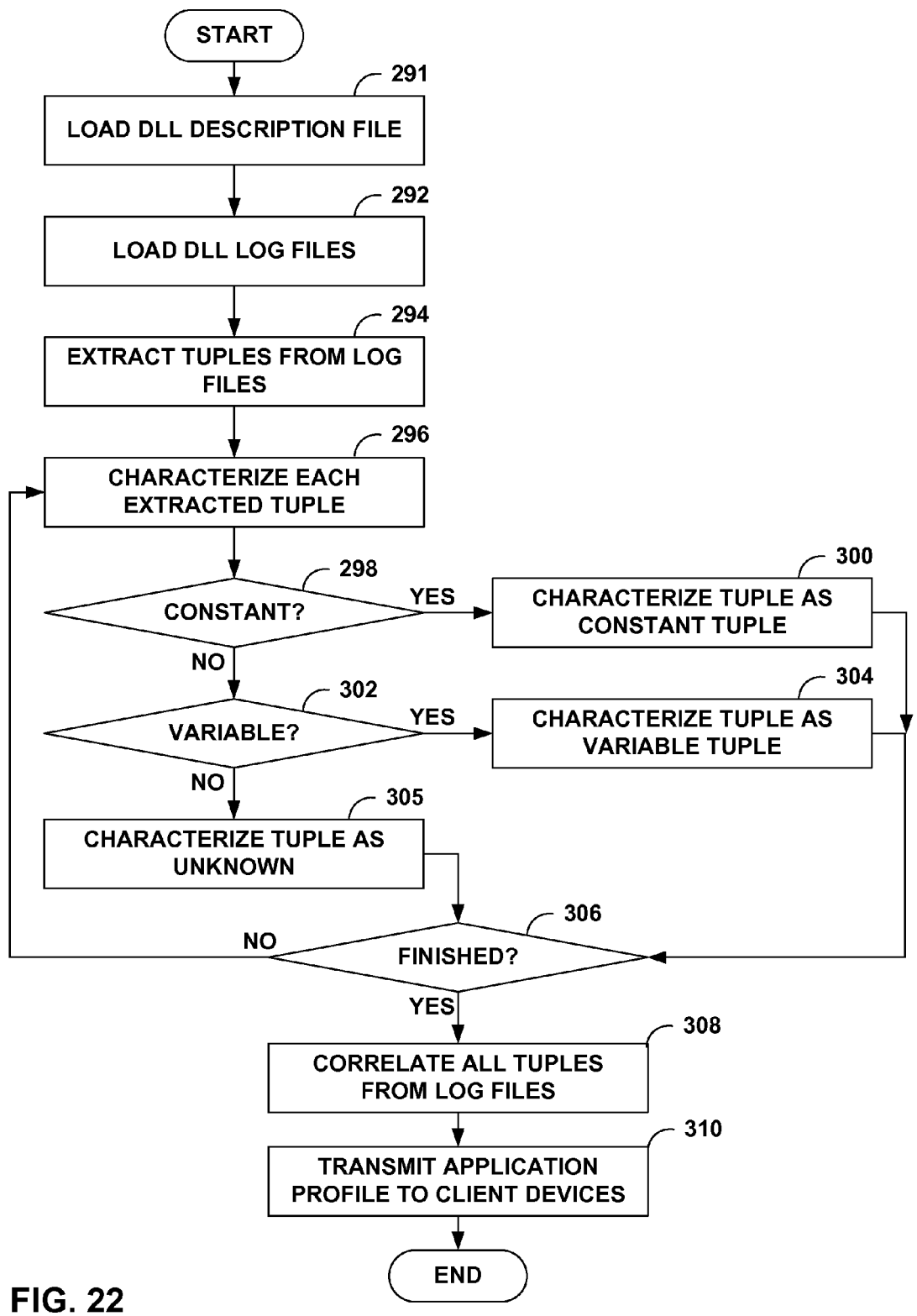
FIG. 22 is a flowchart illustrating exemplary operation of an EPP system in generating an application profile based on empirical abstraction, characterization, and correlation of tuples extracted from client log files.

FIG. 22 is a flowchart illustrating exemplary operation of an EPP system, such as EPP server 226 of FIG. 19A, in generating an application profile, such as profile 224, based on empirical abstraction, characterization, and correlation of tuples extracted from client log files, such as client log files 252. For purposes of illustration, the flowchart of FIG. 22 will be described in reference to FIGS. 19A, 19B, although the method may be implemented on different devices and within a different context, e.g., a public network instead of a private enterprise network, from that illustrated in the figures.

Initially, a network administrator may optionally load privilege description file 250 into privilege profiler module 254, as described above (291). As further described above, XSLT processor 254B may be used to invoke translator 54A to translate privilege description file 250 into a set of extraction rules embodied within extraction rules 254C. Upon one of the above described triggering events, privilege profiler module 254 loads client log files 252, whereupon the XSLT processor 254B applies extraction rules 254C, as described above, and analyzer 54D begins the generation of profile 224 (292).

XSLT processor 254B begins by first extracting all information necessary to form tuples from client log files 252 and building the abstract tuples from this information, both according to the rules defined within extraction rules 254C (294). Once extracted, XSLT processor 254B stores the abstract tuples to privilege files 254D. Analyzer 254E reads privilege files 254D to characterize each of the extracted tuples (296). Analyzer 254E characterizes the tuples by determining whether each extracted tuple contains information matching one of the defined constant strings (298). As described above, analyzer 254E may rely on other criteria, such as a file operation and the directory in which the file is located, in determining constant tuples and the invention should not be limited as such; however, for ease of illustration purposes, only constant strings are described herein.

If a match occurs ("CONSTANT" 298), analyzer 254E characterizes the tuple as a constant tuple (300). If no match occurs and it determines that the tuple matches one of the previously not-yet-categorized tuples of profile 224, or in some embodiments, if a match counter reaches a certain threshold ("VARIABLE" 302), analyzer 254E characterizes the tuple as a variable tuple (304). If no match to a not-yet-categorized tuple occurs in the variable comparison, analyzer 254E characterizes the tuple as a not-yet-categorized tuple (305). Analyzer 254E continues to characterize the extracted tuples until it characterizes all of the extracted tuples, i.e., finishes ("NO" 306, 296-306). Throughout characterization, analyzer 254E may correlate tuples in order to characterize them, as described above in reference to characterizing variable tuples.

Once analyzer 254E finishes characterizing all of the extracted tuples ("YES" 306), it updates profile 224 with the characterized tuples by inserting new privileges, updating the characterization of not-yet-categorized tuples, or performing both. Privilege profile module 254 optionally transmits updated profile 224 to client devices 228 or writes the profile to a file system for copying and distribution as a filter (310). In this manner, an EPP system, such as EPP server 226, may generate profile 224 by extracting tuples from client log files 252 provided by client devices 228, characterizing those tuples, and correlating those characterized tuples.

While described above in reference to a computer network, and more specifically, an enterprise computer network, the principles of the invention may include other configurations involving public networks, such as the internet, as well as, non-networked configurations. An exemplary public network configuration may include an EPP server similar to EPP server 226 and a multitude of client devices similar to client devices 228. Client devices 228 may register with EPP server 226, whereby the registration process EPP server 226 installs the required wrapper 240 and upload module 234. Client device 228A, for example, may then upload log file 244A to EPP server 226 via the public network. EPP server 226 may process log file 244A, as described above, to generate profile 224.

An exemplary non-networked configuration may include a single computer system, wherein both the EPP system and application reside within the single computer system. In this instance, the wrapper captures function calls to the kernel reference module and logs these calls. The upload module may still perform deviation checks and upload only those deviations to a section of memory reserved for the EPP system. Once uploaded, the privilege profiler module of the EPP system may load the client log file, generate an application profile based on this client log file, and store the application profile to a portion of memory (e.g., a database) reserved for the application profile. Thus, even though described above in reference to networked configurations, the principles of the invention should not be limited as such.

Finally, the operations described above in reference to the EPP server and the client computing devices typically occur simultaneously and independently. In other words, the client computing device may log calls to its kernel prior to the configuration of the EPP server to generate application profiles, or the EPP server may be configured to generate application profiles even though the client computing devices currently does not log calls to its kernel. Thus, although the above description may appear to indicate contingent operation by both the EPP server and the client computing devices, the principles of the invention should not be construed to require such contingent operation. Various embodiments of the invention have been described. These and other embodiments are within the scope of the claims listed below.

Example #1

An exemplary prototype of the techniques described herein was developed that allowed client devices executing the Windows XP operating system to record function calls to the Windows XP kernel via the "ntdll.dll" kernel reference module. The wrapper encased the ntdll.dll Windows XP kernel reference module, or simply ntdll.dll, and enabled logging of function calls to the ntdll.dll according to conventional wrapper techniques. Applications including Microsoft Word, Microsoft Outlook, the Windows XP calculator application, and the Windows XP netsh application typically make function calls to ntdll.dll that require the exercise of system-level privileges.

As described above in reference to FIG. 2A, users interacted with the client device to load and execute an application, such as application instance 242A, within the Windows XP O/S, such as O/S 230A. The application instance called functions specified in ntdll.dll, or kernel interface module 238A, whereupon the wrapper intercepted the function call. The wrapper logged the empirical information relating to the exercise of privileges necessary for a successful function call. A wrapper around the application was used to determine the program point that ultimately originated the call to the Windows XP kernel. Once the user terminated the application instance, the wrapper stopped logging the function calls to ntdll.dll, and an upload module, such as upload module 234, uploaded the log to an EPP server, such as EPP server 226, where a composite profile was generated for the plurality of client devices.

Assuming in this example that the software application instance comprised an instance of the Microsoft Notepad application, EPP server 226 may generate the following profile after eight client log files corresponding to eight execution of Notepad instances have been uploaded to EPP server 226 (Note: only file resources are mentioned in this partial profile, but EPP can characterize resources of all kinds, including files, directories, registry keys, and communications ports):

30 Constant Resources
    notepad.exe, DLLs, pipes

5 Variable Resources (Each Represents at Least 5 Actual Files, Often Many More)
    Files read by notepad
    New file created by notepad
    Directories traversed to get to an edited file
    Files located in directories traversed by Notepad
    Shadow file
24 Not-Yet-Categorized Resources (Out of 633 in All 8 Executions)
    24 files were not categorized In the above exemplary profile, EPP server 214 generated a profile containing 30 constant tuples describing use of 30 constant resources, 6 variable tuples describing use of 6 variable resources, and 24 not-yet-categorized tuples describing use of 24 not-yet-categorized resources. The 30 constant tuples describe how Notepad uses notepad.exe, various DLLs, and various pipes, all of which are named files or pipes that it expects to be present. The 6 variable tuples group files used by notepad.exe into categories. Each of these variable tuples describes Notepad's use of at least 5 actual files, and often many more. The 24 not-yet-categorized tuples describe Notepad's use of 24 files which have not yet reached the threshold use amount. In this example, EPP server 24 required that 5 resources accessed during the 8 execution of notepad.exe have a matching characterization in order for it to be characterized. Therefore, these 24 not-yet-categorized tuples match fewer than 4 other resources accessed during the 8 executions of notepad.exe.

Example #2

Profiles were compiled for the following Windows XP and Vista software applications: Acrobat, Acrobat Reader, Excel, Firefox, MS Calculator, Outlook, WordPad, Word and Notepad. Windows XP was used as a client operating system for our tests.

The processes tested stock programs running no hidden functions. Tests were run against 3 different common processes: Word, Excel, and Outlook and then utilized the generated profiles as a filter within our mobile forensic device to filter volatile data collected from a target computing device in the lab. In every case, the display of both DLLs and filed handles shrank dramatically, as shown below in Table 1. The filtered list of DLLs generally fit on a single screen, and the handle list, wile longer, was much more easily perused manually. The filtering process did not remove any significant data, such as the .doc file Word was editing or the Acrobat process started by Outlook on a PDF attachment.

TABLE 1

| Process | Without Filtering | | With Filtering | | % Reduction | |
|---|---|---|---|---|---|---|
| | DLLs | Handles | DLLs | Handles | DLLs | Handles |
| Excel | 70 | 286 | 25 | 74 | 64% | 74% |
| Outlook | 101 | 707 | 44 | 112 | 57% | 84% |
| Word | 63 | 248 | 23 | 57 | 64% | 77% |

A principled way of automatically filtering non-relevant data from running software processes using live forensic tools has been described, thus allowing a higher quality of data to be presented to the forensic investigator. This may enable the investigators to more quickly find forensically significant data, such as user-specified files a process is writing or registry keys that contain process-state information. Moreover, the techniques allow generation of profiles from client computers of within an enterprise before, after or even concurrently with taking a forensic snapshot of one or more target computers in the enterprise network.

The following test illustrates portions of an aggregate privilege profile generated from a plurality of clients executing Microsoft Outlook on Windows XP.

```
PROGRAM_NAME      outlook.exe
OPERATING_SYSTEM  XP
SERVICE_PACK      0
// Listing of correlated file handles and variants
FILE      APPLICATION "%allusersprofile%\application
          data\microsoft\office\data\opa11.bak"
ALSO      "%homedrive%\documents and settings\all users\application
          data\microsoft\office\data\opa11.bak"
ALSO      "%systemdrive%\documents and settings\all users\application
          data\microsoft\office\data\opa11.bak"
ALSO      "c:\documents and settings\all users\application
          data\microsoft\office\data\opa11.bak"
FILE      APPLICATION "%allusersprofile%\application
          data\microsoft\office\data\opa11.dat"
ALSO      "%homedrive%\documents and settings\all users\application
          data\microsoft\office\data\opa11.dat"
ALSO      "%systemdrive%\documents and settings\all users\application
          data\microsoft\office\data\opa11.dat"
ALSO      "c:\documents and settings\all users\application
          data\microsoft\office\data\opa11.dat"
                       .
                       .
                       .
FILE      APPLICATION "%appdata%\microsoft\office\msout11.pip"
ALSO      "%homedrive%\documents and settings\%username%\application
          data\microsoft\office\msout11.pip"
ALSO      "%systemdrive%\documents and settings\%username%\application
          data\microsoft\office\msout11.pip"
ALSO      "%userprofile%\application data\microsoft\office\msout11.pip"
ALSO      "c:\documents and settings\%username%\application
          data\microsoft\office\msout11.pip"
```

```
// Listing of registry keys
KEY     APPLICATION "\hkcr"
KEY     APPLICATION "\hkcu\environment"
          .
          .
          .
KEY     APPLICATION "\hkcu\software\microsoft\exchange\exchange
          provider"
```

```
// Listing of network activity
NETWORK    APPLICATION "(tcp, 255.255.255.255, 0)"
NETWORK    APPLICATION "(tcp, 255.255.255.255, 80)"
             .
             .
NETWORK    APPLICATION "(tcp, server20, 1054)"
```

```
// Listing of correlated DLLs and variants
DLL      APPLICATION "%homedrive%\program files\common
           files\microsoft shared\ink\skchui.dll"
ALSO       "%systemdrive%\program files\common files\microsoft
           shared\ink\skchui.dll"
ALSO       "c:\program files\common files\microsoft
           shared\ink\skchui.dll"
DLL      APPLICATION "%homedrive%\program files\common
           files\microsoft shared\office11\mso.dll"
ALSO       "%systemdrive%\program files\common files\microsoft
           shared\office11\mso.dll"
ALSO       "c:\program files\common files\microsoft
           shared\office11\mso.dll"
             .
             .
             .
DLL      APPLICATION "%homedrive%\program files\common
           files\microsoft shared\office11\msxml5.dll"
ALSO       "%systemdrive%\program files\common files\microsoft
           shared\office11\msxml5.dll"
ALSO       "c:\program files\common files\microsoft
           shared\office11\msxml5.dll"
```

As illustrated above, the profile lists the program name and operating system to which the profile applies. The next portion lists the unique file handles and their variants that were used on at least M different client devices, where M is a user-configurable threshold. In such cases, the unique file handles were included within the aggregate profile and, therefore, deemed potentially less important from a forensic perspective. The profile then lists registry keys, network activity and identified DLLs and correlated commonly detected variants.

Figure 23:
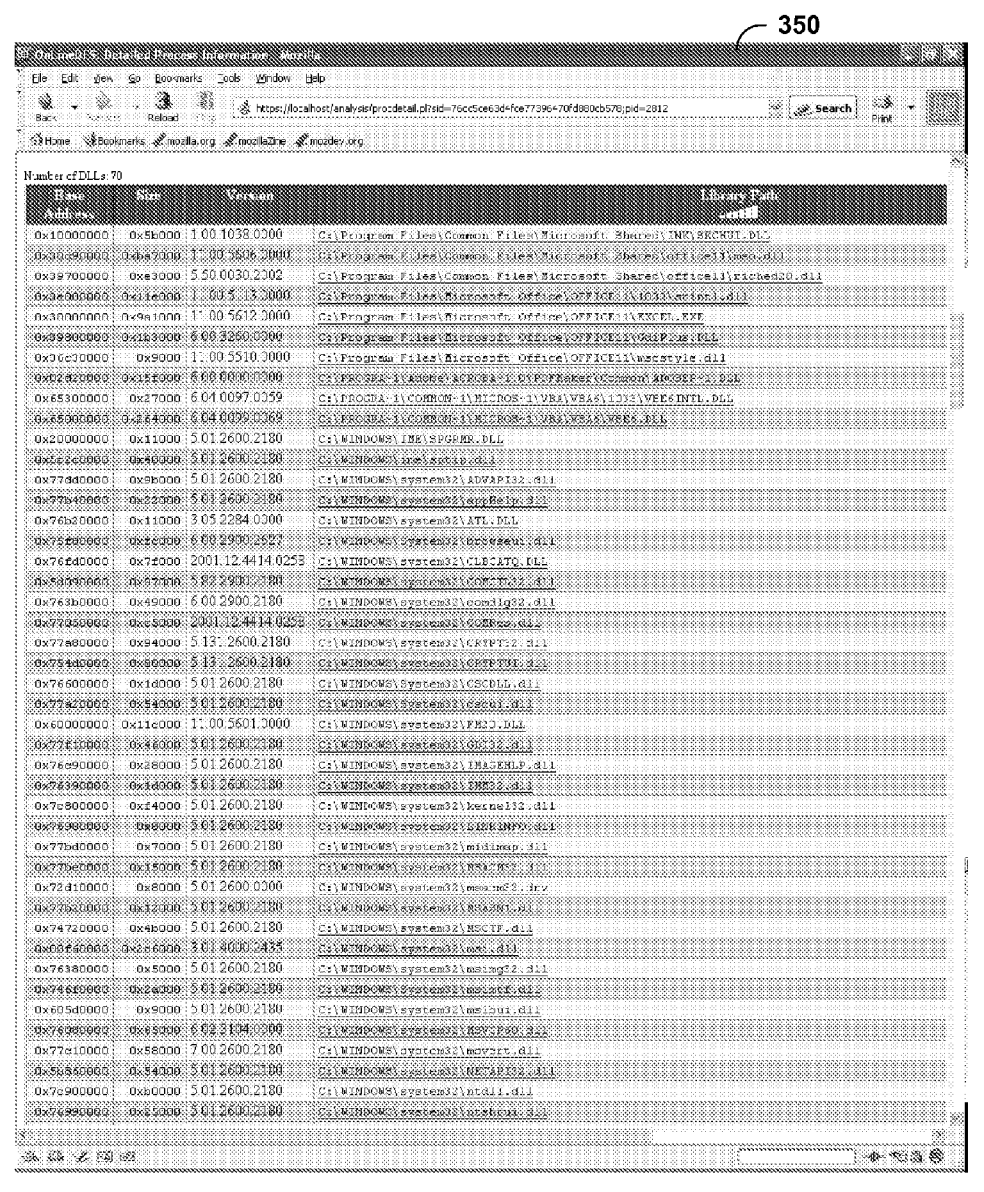

FIG. 23 is a screen illustration of an exemplary user interface 350 presented by the forensic device for viewing evidence acquired from a target computing device when privilege profile-filtering is not enabled. In the example illustrated in FIG. 23, user interface 350 presents running process data acquired from target computing device 213 (FIG. 18). Specifically, user interface 126 includes a chart that includes a list of dynamic link libraries (DLLs) that were currently loaded into memory for a Microsoft Excel process executing on the target computing device at the time the forensic snapshot was taken. In this example, user interface 230 presents the first of three screens listing 70 DLLs from the target computing device 213 that were associated with the Excel process.

Figure 24:
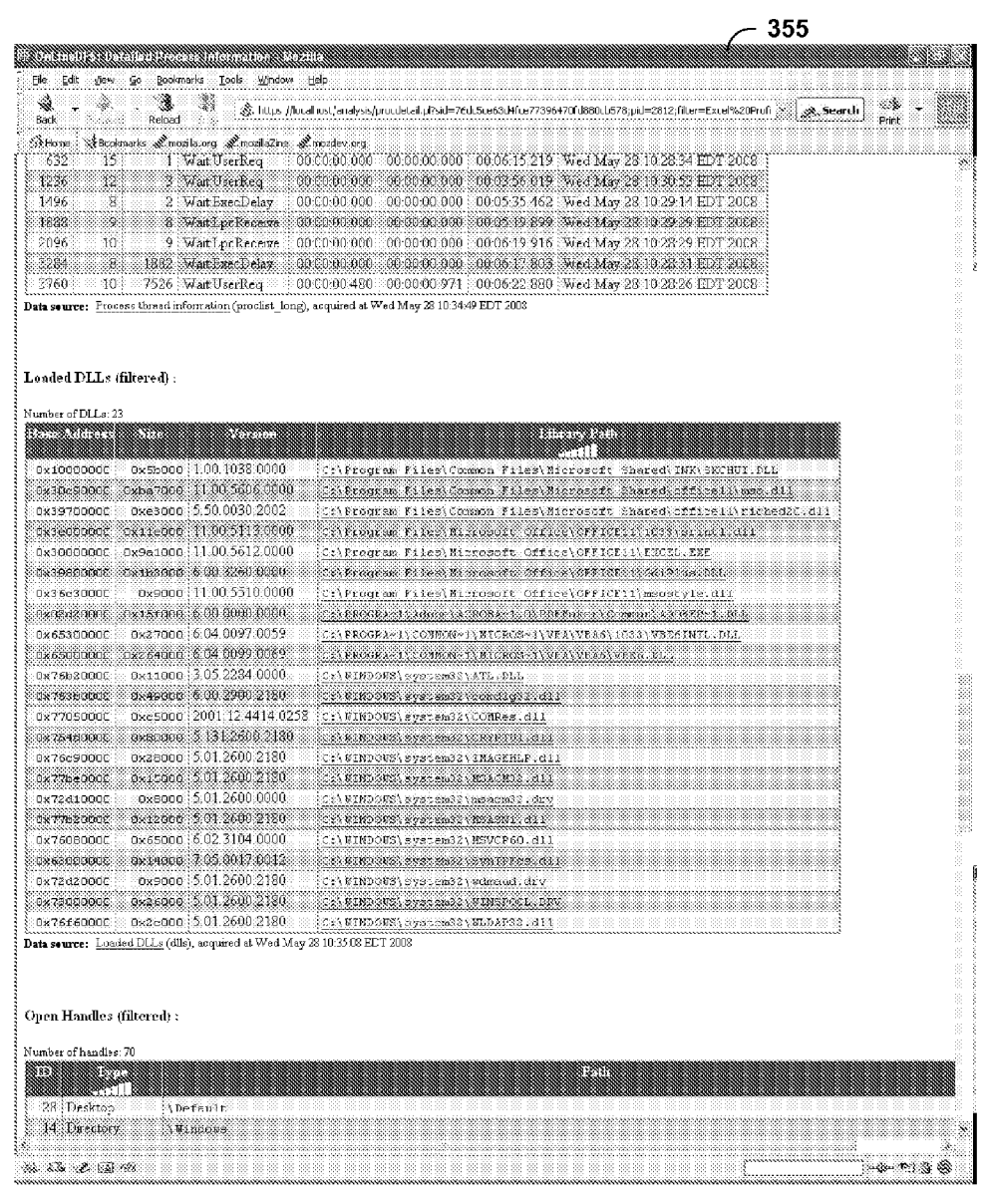

FIG. 24 is a screen illustration of an exemplary user interface 355 presented by the forensic device for viewing the same evidence acquired from target computing device 213 when filtering is enabled using an aggregate privilege profile generated for the Excel software application. In this case, number of DLLs presented by user interface 355 has been reduced to twenty-three, which fits easily on a single screen. That is, only twenty-three DLLs associated with Microsoft Excel process on the target computing device did not match any of the DLLs listed in the aggregate privilege profile. Similarly, user interface 355 presents non-matching open file handles and registry keys, thereby reducing the amount of digital data for consideration by the forensic investigator.

Various embodiments of the invention have been described. For example, although described in reference to collection of computer evidence in a forensic inquiry, the techniques of the invention may be applied in other computer data monitoring and analysis scenarios. For instance, the techniques of the invention may allow a network monitor to continuously or periodically monitor a network, including the states of computing devices on the network. The network administrator may be able to acquire detailed state information and other data from the computing devices of the network in order to address network problems as well as monitor and assess network misuse. These and other embodiments are within the scope of the following claims.

The invention claimed is:

1. A method comprising:
   capturing empirical information relating to the exercise of privileges by a plurality of instances of a software application, the instances of the software application executing on top of a plurality of instances of a platform;
   dynamically generating an application profile that describes the aggregate exercise of privileges by the plurality of instances of the software application based on the empirical information;
   receiving, with a forensic device coupled to a target computing device via a communication link, input from user that identifies computer evidence to acquire from the target computing device;
   acquiring the computer evidence from the target computing device with the forensic device;
   filtering the computer evidence on the forensic device with the application profile; and
   presenting a user interface for the forensic device through which the remote user views and analyzes, using the client device, the filtered computer evidence acquired from the target computing device.

2. The method of claim 1,
   wherein capturing the empirical information includes capturing empirical information relating to the exercise of system-level privileges by the plurality of instances of the software application executing on top of the plurality of instances of the platform, and
   wherein dynamically generating the application profile comprises dynamically generating in real-time the application profile that describes the aggregate exercise of system-level privileges by the plurality of instances of the software application based on the empirical information.

3. The method of claim 1, wherein capturing the empirical information includes capturing one or more of contents of any file handles or other nested structures, a return status, and argument values from an invocation of a kernel reference module and a program counter of the calling one of the plurality of software application instances.

4. The method of claim 1, further comprising:
   logging the empirical information to a plurality of log files; and uploading the plurality of log files to an empirical privilege profiler (EPP) system with an upload module.

5. The method of claim 4, wherein dynamically generating an application profile includes dynamically generating an application profile based on the uploaded plurality of log files with the EPP system.

6. The method of claim 4, wherein uploading the plurality of log files includes:
determining whether the plurality of log files includes empirical information describing privileges that deviate from the corresponding application profile with the upload module; and
uploading only a portion of the empirical information that describes privileges that deviate from the corresponding application profile with the upload module.

7. The method of claim 1, wherein dynamically generating the application profile includes:
extracting privilege tuples that each describe a program point and a resource accessed by a respective one of the instances of the software application;
identifying multiple privilege tuples that reference a resource using a same name and program point from at least a threshold number of different client devices; and
updating the application profile to include the name of the resource.

8. The method of claim 7, the threshold number of client devices is user-configurable.

9. The method of claim 7,
wherein extracting the privilege tuples comprises extracting the privilege tuples from the empirical information according to a description file.

10. The method of claim 1, further comprising:
storing the application profile in the form of a filter; and
installing the filter on the forensic device prior to receiving the input from the user identifying the target computing device.

11. The method of claim 1, further comprising transmitting the application profile generated by the EPP system to the plurality of client devices.

12. The method of claim 11, further comprising utilizing the application profile within the client device to enable one or more of detection of system intrusions, monitoring of privilege use by the plurality of instances of the software application, and facilitating development of the software application.

13. A method comprising:
capturing empirical information relating to the exercise of privileges by a software application instance executing within a client device;
logging the empirical information to a log file with a wrapper included within the client device; and
generating an application profile with an empirical privilege profiler (EPP) system that describes the aggregate exercise of privileges by the software application instance;
communicating the application profile to a forensic device;
receiving, with the forensic device coupled to a target computing device via a communication link, input from a user that identifies computer evidence to acquire from the target computing device;
acquiring the computer evidence from the target computing device with the forensic device;
filtering the acquired computer evidence on the forensic device with the application profile; and
presenting a user interface for the forensic device through which the remote user views and analyzes, using the client device, the filtered computer evidence acquired from the target computing device.

14. The method of claim 13, wherein capturing the empirical information includes capturing empirical information relating to the exercise of system-level privileges by the software application instance executing within the client devices.

15. The method of claim 13, wherein capturing the empirical information includes capturing one or more of contents of any file handles or other nested structures, a return status, and argument values from an invocation of a kernel reference module and a program counter of the calling one of the plurality of software application instances.

16. The method of claim 13, wherein logging the empirical information includes logging the empirical information to a log file according to extensible markup language (XML) specification with a wrapper that encases one of a Microsoft Windows digital link library (DLL) structure that references the Windows operating system kernel, a UNIX operating system kernel, and a Linux operating system kernel, an operating system from Apple Incorporated, or a Java Virtual Machine.

17. The method of claim 16, wherein logging the empirical information includes logging the empirical information to the log file according to XML specifications with a wrapper that encases a Microsoft Windows digital link library (DLL) structure that references the Windows operating system kernel.

18. The method of claim 16, wherein logging the empirical information includes logging the empirical information to the log file according to XML specifications with a wrapper that encases a UNIX operating system kernel reference structure.

19. The method of claim 16, wherein logging the empirical information includes logging the empirical information to the log file according to XML specifications with a wrapper that encases a Linux operating system kernel reference structure.

20. The method of claim 13, wherein uploading the plurality of log files includes:
determining whether the plurality of log files includes empirical information describing privileges that deviate from the application profile with the upload module of each of the client devices; and
uploading only a portion of the empirical information that described privileges that deviate from the corresponding application profile with the upload module of each of the client devices.

21. A method comprising:
receiving log files uploaded by a plurality of client devices, wherein log files include information relating to the exercise of privileges by a plurality of instances of a software application executing on top of a plurality of instances of a platform residing within the plurality of client devices;
executing computer-implemented privilege profiling software to dynamically generate an application profile that describes the aggregate exercise of privileges by the plurality of instances of the software application based the uploaded log files; and
communicating the application profile to a forensic device for filtering forensic evidence.

22. The method of claim 21, wherein dynamically generating the application profile comprises dynamically generating in real-time the application profile based on uploaded log files with the EPP system, wherein the log files record kernel calls by the plurality of instances of the software application executing on top of the plurality of instances of the platform residing within the plurality of client devices.

23. A system comprising:
- a plurality of client computing devices that capture empirical information relating to the exercise of privileges by a plurality of instances of a software application, the instances executing on top of a plurality of instances of a platform residing within the plurality of client computing devices;
- an empirical privilege profiler system that dynamically generates an application profile that describes the aggregate exercise of privileges by the plurality of instances of the software application based the empirical information; and
- a target computing device;
- a forensic device coupled to the target computing device via a customer network of the target computing device; and
- an access device executing a user interface module to present a user interface for the forensic device that is remotely accessible by the access device,
- wherein the forensic device acquires computer evidence from the target computing device, filters the computer evidence using the application profile generated by the empirical privilege profiler by identifying resources within the computer evidence that do not match the application profile, and presents the filtered computer evidence to the remote user for analysis via the user interface.

24. The system of claim 23,
- wherein the plurality of client computing devices capture the empirical information by capturing empirical information relating to the exercise of system-level privileges by the plurality of instances of the software application executing on top of the plurality of instances of the platform residing within the plurality of client computing devices, and
- wherein the EPP system dynamically generates the application profile by dynamically generating the application profile that describes the aggregate exercise of system-level privileges by the plurality of software application instances based on the empirical information.

25. The system of claim 23, wherein the forensic device presents a user interface to the remote user to allow the remote user to view and analyze the filtered computer evidence online.

26. The system of claim 23, wherein the plurality of client computing devices capture empirical information by capturing one or more of contents of any file handles or other nested structures, a return status, and argument values from an invocation of a kernel reference module and a program counter of the calling one of the plurality of instances of the software application.

27. The system of claim 23, wherein the plurality of client computing devices each comprise:
- a wrapper that logs the empirical information to a plurality of log files; and
- an upload module that uploads the plurality of log files to the EPP system.

28. The system of claim 27, wherein the EPP system dynamically generates the application profile by dynamically generating in real-time an application profile based on the uploaded plurality of log files uploaded to the EPP system by the upload module.

29. The system of claim 27, wherein the upload module uploads the plurality of log files by:
- determining whether the plurality of log files includes empirical information describing privileges that deviate from the corresponding application profile; and
- uploading only a portion of the empirical information that described privileges that deviate from the corresponding application profile.

30. The system of claim 23, wherein the EPP system comprises a privilege profiler module that generates the application profile by:
- extracting privilege tuples that each describe a program point and a resource accessed by a respective one of the instances of the software application;
- identifying multiple privilege tuples that reference a resource using a same name and program point from at least a threshold number of different client devices; and
- updating the application profile to include the name of the resource.

31. The system of claim 30, wherein threshold number of client devices is user-configurable.

32. The system of claim 23, wherein the EPP system maintains a database of filters, each of the filters corresponding to a different application profile generated by the EPP system.

33. The system of claim 23, wherein in response to the empirical information captured by the client devices, the empirical privilege profiler maintains and continuously updates a filter database of application profiles for access by the forensic devices when needed.

* * * * *